(12) United States Patent
Sjöberg et al.

(10) Patent No.: US 12,666,032 B2
(45) Date of Patent: Jun. 23, 2026

(54) VIDEO CODING LAYER UP-SWITCHING INDICATION

(71) Applicant: Telefonaktiebolaget LM Ericsson (publ), Stockholm (SE)

(72) Inventors: Rickard Sjöberg, Stockholm (SE); Martin Pettersson, Vallentuna (SE); Mitra Damghanian, Upplands-Bro (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 18/672,692

(22) Filed: May 23, 2024

(65) Prior Publication Data

US 2024/0323388 A1 Sep. 26, 2024

Related U.S. Application Data

(63) Continuation of application No. 17/621,160, filed as application No. PCT/SE2020/050522 on May 20, 2020, now Pat. No. 12,022,084.
(Continued)

(51) Int. Cl.
*H04N 19/136* (2014.01)
*H04N 19/169* (2014.01)
(Continued)

(52) U.S. Cl.
CPC ......... *H04N 19/136* (2014.11); *H04N 19/172* (2014.11); *H04N 19/188* (2014.11); *H04N 19/46* (2014.11)

(58) Field of Classification Search
CPC .................................................... H04N 19/136
See application file for complete search history.

(56) References Cited

U.S. PATENT DOCUMENTS

| | | | |
|---|---|---|---|
| 8,489,872 | B1 | 7/2013 | Kapoor |
| 9,584,820 | B2 | 2/2017 | Deshpande |

(Continued)

FOREIGN PATENT DOCUMENTS

| | | |
|---|---|---|
| CN | 104335585 A | 2/2015 |
| CN | 104937942 A | 9/2015 |

(Continued)

OTHER PUBLICATIONS

Zhang, N., et al., "Multiple Description Image Coding Based on Directional Lifting Wavelet Transform", Acta Automatica Sinica, vol. 33, No. 5, May 2007 (10 pages).
(Continued)

*Primary Examiner* — Jerry T Jean Baptiste
(74) *Attorney, Agent, or Firm* — Rothwell, Figg, Ernst & Manbeck, P.C.

(57) ABSTRACT

A method for decoding a set of pictures from a bitstream. In one embodiment, the method comprises obtaining a layer access (LA) indication identifying an LA picture in an access unit, wherein i) the LA picture has a layer identifier value that identifies a layer and ii) the LA picture is followed by other pictures in a decoding order. The method comprises determining, based on the LA indication, an LA position in the bitstream. The method comprises decoding the LA picture and the other pictures following the LA picture in the decoding order, wherein no parameter set that: a) has a particular type, b) has a layer identifier value equal to the layer identifier value of the LA picture, and c) precedes the LA position is used for decoding the LA picture.

14 Claims, 10 Drawing Sheets

Related U.S. Application Data

(60) Provisional application No. 62/864,683, filed on Jun. 21, 2019.

(51) Int. Cl.
  H04N 19/172        (2014.01)
  H04N 19/46         (2014.01)

(56) References Cited

U.S. PATENT DOCUMENTS

|  |  |  |  |  |
|---|---|---|---|---|
| 9,674,532 | B2 * | 6/2017 | Kim | H04N 19/30 |
| 10,116,940 | B2 | 10/2018 | Hendry | |
| 10,375,405 | B2 | 8/2019 | Chen | |
| 2015/0103881 | A1 | 4/2015 | Hendry et al. | |
| 2015/0110192 | A1 | 4/2015 | Wang | |
| 2015/0201204 | A1 | 7/2015 | Chen | |
| 2015/0304666 | A1 | 10/2015 | Seregin | |
| 2016/0014430 | A1 | 1/2016 | Hinz | |
| 2016/0044309 | A1 * | 2/2016 | Choi | H04N 19/33 |
|  |  |  |  | 375/240.12 |
| 2016/0212439 | A1 | 7/2016 | Hannuksela | |
| 2017/0163994 | A1 | 6/2017 | Sanchez De La Fuente | |
| 2017/0237999 | A1 | 8/2017 | Hendry | |
| 2017/0289556 | A1 | 10/2017 | Hendry | |
| 2017/0339392 | A1 | 11/2017 | Forutanpour | |
| 2017/0339418 | A1 | 11/2017 | Ramasubramonian | |
| 2017/0339421 | A1 | 11/2017 | Wang | |
| 2017/0347026 | A1 | 11/2017 | Hannuksela | |
| 2017/0347109 | A1 | 11/2017 | Hendry | |
| 2017/0347163 | A1 | 11/2017 | Wang | |
| 2017/0347165 | A1 * | 11/2017 | Wang | H04N 21/432 |
| 2018/0098077 | A1 | 4/2018 | Skupin | |
| 2018/0098086 | A1 | 4/2018 | Chuang | |
| 2018/0098087 | A1 | 4/2018 | Li | |
| 2018/0103199 | A1 | 4/2018 | Hendry | |
| 2018/0139469 | A1 | 5/2018 | Lainema | |
| 2018/0184098 | A1 | 6/2018 | Denoual | |
| 2018/0192050 | A1 | 7/2018 | Zhang | |
| 2018/0270500 | A1 | 9/2018 | Li | |
| 2018/0278964 | A1 | 9/2018 | Wang | |
| 2019/0012839 | A1 | 1/2019 | Wang | |
| 2020/0236371 | A1 | 7/2020 | Nishi et al. | |
| 2021/0127140 | A1 | 4/2021 | Hannuksela | |
| 2021/0195206 | A1 | 6/2021 | Hannuksela | |

FOREIGN PATENT DOCUMENTS

|  |  |  |  |
|---|---|---|---|
| CN | 109076264 | A | 12/2018 |
| WO | 2013/160040 | A1 | 10/2013 |
| WO | 2019/069968 | A1 | 4/2019 |
| WO | 2019/115865 | A1 | 6/2019 |

OTHER PUBLICATIONS

International Search Report and Written Opinion issued in International Application No. PCT/SE2020/050522 dated Aug. 18, 2020 (16 pages).

IPRP issued in International Application No. PCT/SE2020/050522 dated Sep. 21, 2021 (10 pages).

Benjamin Bross et al., "Versatile Video Coding (Draft 5)", Joint Video Experts Team (JVET) of ITU-T SG 16 WP 3 and ISO/IEC JTC 1/SC 29/WG 11, Document: JVET-N1001-v7, 14th Meeting: Geneva, CH, Mar. 19-27, 2019 (384 pages).

Benjamin Bross et al., "Versatile Video Coding (Draft 5)", Joint Video Experts Team (JVET) of ITU-T SG 16 WP 3 and ISO/IEC JTC 1/SC 29/WG 11, Document: JVET-N1001-v8, 14th Meeting: Geneva, CH, Mar. 19-27, 2019 (397 pages).

Rickard Sj?berg, et al., "AHG17: Ensuring temporal switching with STSA pictures", Joint Video Experts Team (JVET) of ITU-T SG 16 WP 3 and ISO/IEC JTC 1/SC 29/WG 11, Document: JVET-00235, 15th Meeting: Gothenburg, SE, Jul. 3-12, 2019, (3 pages).

Rec. ITU-T H.265 v4, High efficiency video coding, (Dec. 2016) (664 pages).

Sjöberg, R. et al., Chapter 2, "HEVC High-Level Syntax", XP055580157, Aug. 23, 2014 (36 pages).

Sjöberg, R. et al., "Overview of HEVC high-level syntax and reference picture management", IEEE Transactions on Circuits and Systems for Video Technology, vol. 22, No. 12, XP055045360, Oct. 5, 2012 (14 pages).

* cited by examiner

300
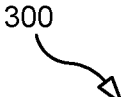
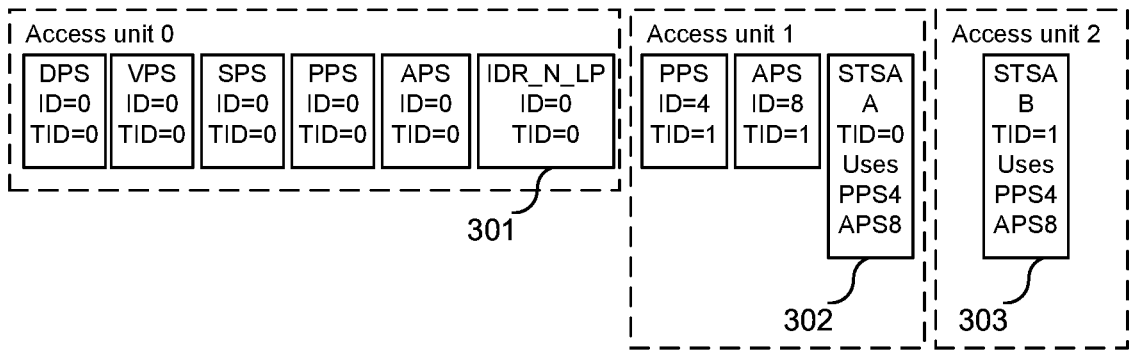
FIG. 3

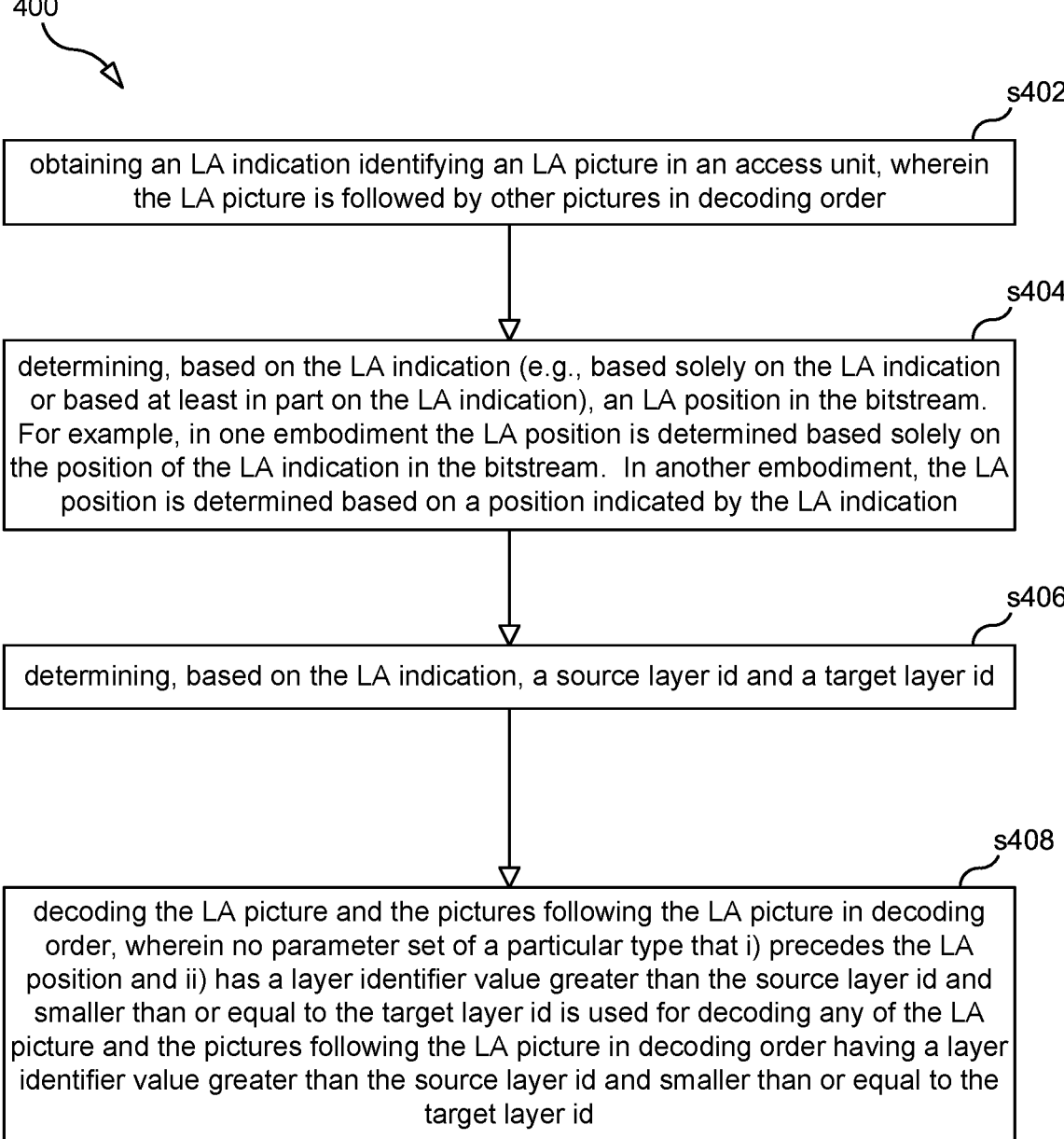

400 s402 obtaining an LA indication identifying an LA picture in an access unit, wherein the LA picture is followed by other pictures in decoding order s404 determining, based on the LA indication (e.g., based solely on the LA indication or based at least in part on the LA indication), an LA position in the bitstream. For example, in one embodiment the LA position is determined based solely on the position of the LA indication in the bitstream. In another embodiment, the LA position is determined based on a position indicated by the LA indication s406 determining, based on the LA indication, a source layer id and a target layer id s408 decoding the LA picture and the pictures following the LA picture in decoding order, wherein no parameter set of a particular type that i) precedes the LA position and ii) has a layer identifier value greater than the source layer id and smaller than or equal to the target layer id is used for decoding any of the LA picture and the pictures following the LA picture in decoding order having a layer identifier value greater than the source layer id and smaller than or equal to the target layer id

FIG. 4

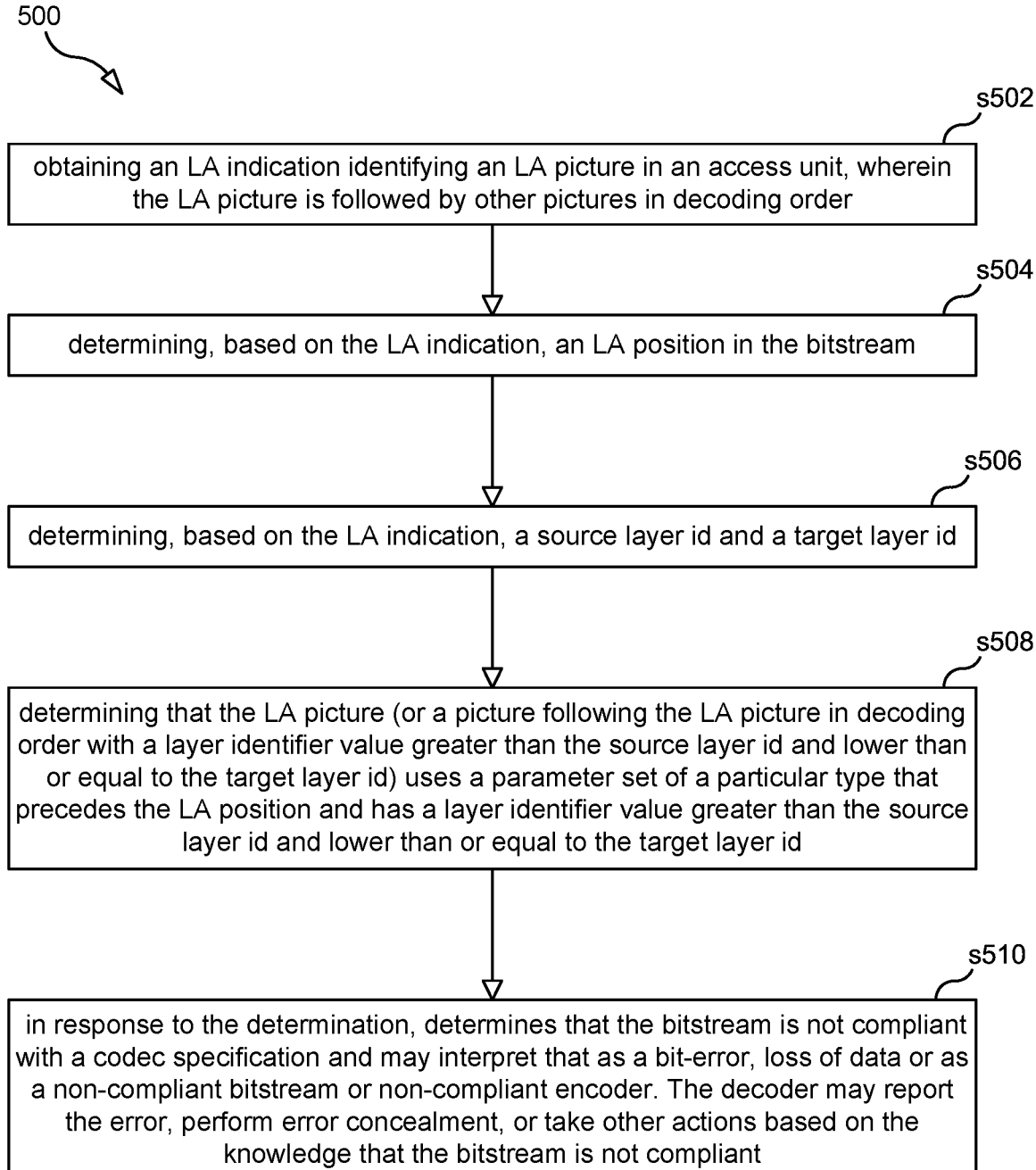

500 s502 obtaining an LA indication identifying an LA picture in an access unit, wherein the LA picture is followed by other pictures in decoding order s504 determining, based on the LA indication, an LA position in the bitstream s506 determining, based on the LA indication, a source layer id and a target layer id s508 determining that the LA picture (or a picture following the LA picture in decoding order with a layer identifier value greater than the source layer id and lower than or equal to the target layer id) uses a parameter set of a particular type that precedes the LA position and has a layer identifier value greater than the source layer id and lower than or equal to the target layer id s510 in response to the determination, determines that the bitstream is not compliant with a codec specification and may interpret that as a bit-error, loss of data or as a non-compliant bitstream or non-compliant encoder. The decoder may report the error, perform error concealment, or take other actions based on the knowledge that the bitstream is not compliant

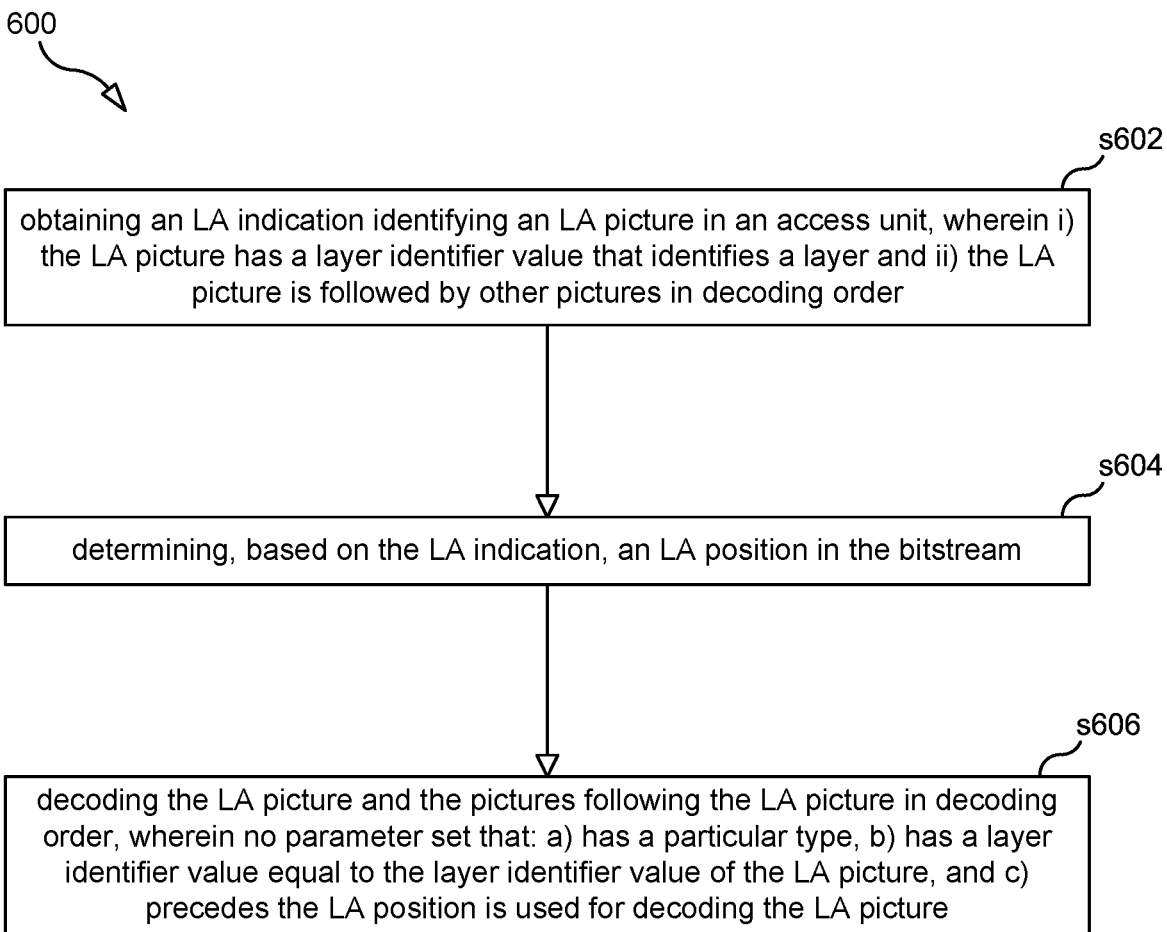

s602 obtaining an LA indication identifying an LA picture in an access unit, wherein i) the LA picture has a layer identifier value that identifies a layer and ii) the LA picture is followed by other pictures in decoding order s604 determining, based on the LA indication, an LA position in the bitstream s606 decoding the LA picture and the pictures following the LA picture in decoding order, wherein no parameter set that: a) has a particular type, b) has a layer identifier value equal to the layer identifier value of the LA picture, and c) precedes the LA position is used for decoding the LA picture

FIG. 6

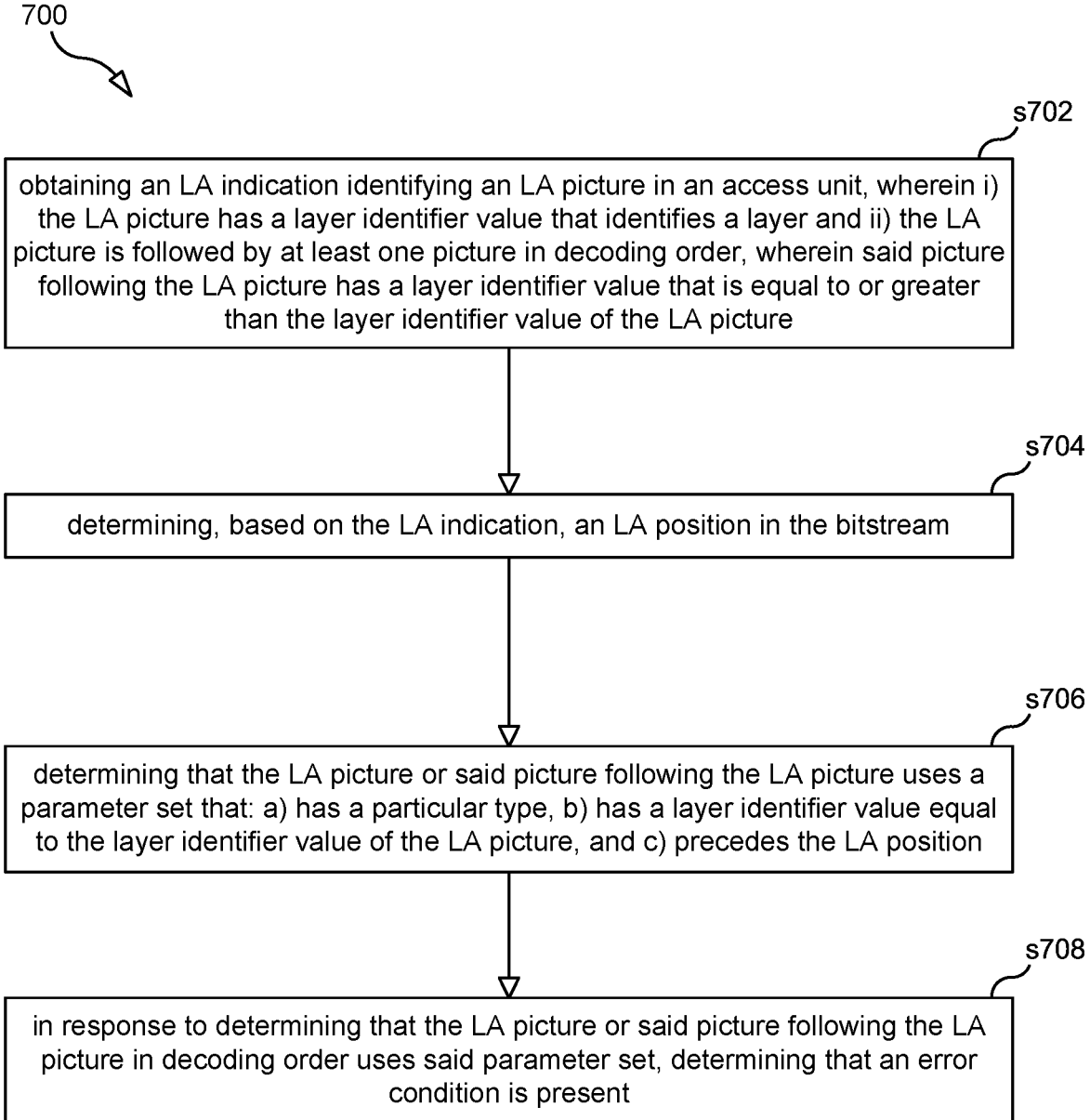

700 s702 obtaining an LA indication identifying an LA picture in an access unit, wherein i) the LA picture has a layer identifier value that identifies a layer and ii) the LA picture is followed by at least one picture in decoding order, wherein said picture following the LA picture has a layer identifier value that is equal to or greater than the layer identifier value of the LA picture s704 determining, based on the LA indication, an LA position in the bitstream s706 determining that the LA picture or said picture following the LA picture uses a parameter set that: a) has a particular type, b) has a layer identifier value equal to the layer identifier value of the LA picture, and c) precedes the LA position s708 in response to determining that the LA picture or said picture following the LA picture in decoding order uses said parameter set, determining that an error condition is present

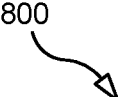

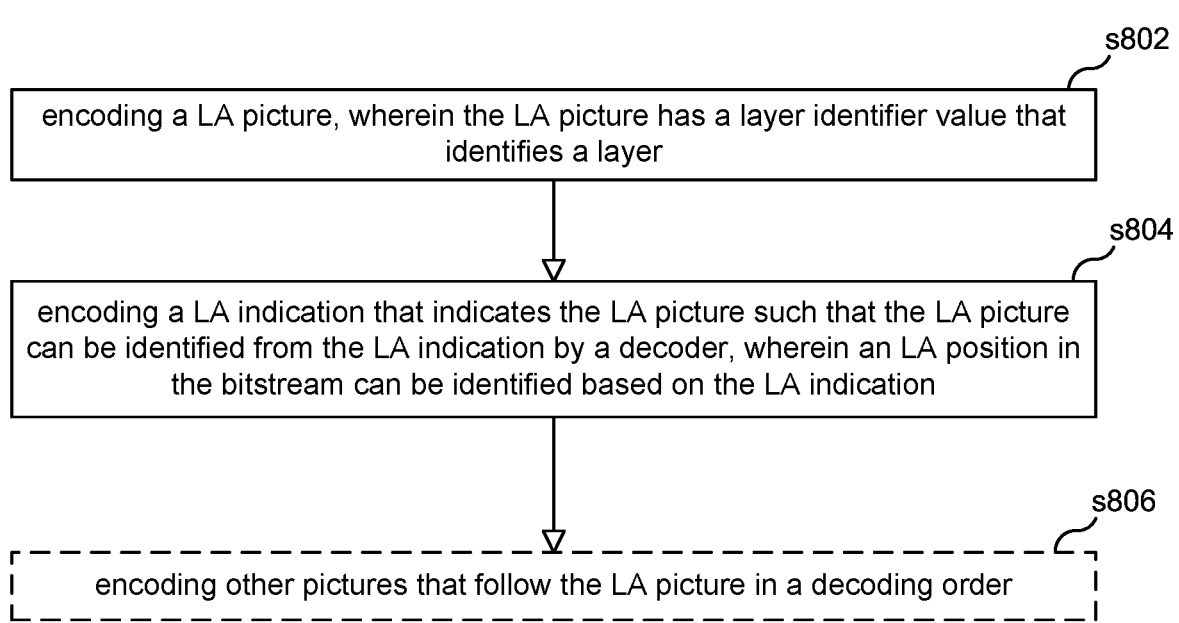

s802 encoding a LA picture, wherein the LA picture has a layer identifier value that identifies a layer s804 encoding a LA indication that indicates the LA picture such that the LA picture can be identified from the LA indication by a decoder, wherein an LA position in the bitstream can be identified based on the LA indication s806 encoding other pictures that follow the LA picture in a decoding order

FIG. 8

VIDEO CODING LAYER UP-SWITCHING INDICATION

CROSS-REFERENCE TO RELATED APPLICATIONS

This application is a continuation of U.S. application Ser. No. 17/621,160, having a 371(c) date of 2021 Dec. 20 (status pending), which is the 35 U.S.C. § 371 National Stage of International Patent Application No. PCT/SE2020/050522, filed 2020 May 20, which claims priority to U.S. provisional patent application No. 62/864,683, filed on 2019 Jun. 21. The above identified applications are incorporated by this reference.

TECHNICAL FIELD

This disclosure relates to video coding and decoding.

BACKGROUND

1.1 HEVC and VVC

High Efficiency Video Coding (HEVC) is a block-based video codec standardized by ITU-T and MPEG. The HEVC video codec utilizes both temporal and spatial prediction. Spatial prediction is achieved using intra (I) prediction from within a current picture. Temporal prediction is achieved using unidirectional (P) or bidirectional (B) inter prediction on block level from previously decoded reference pictures. In the encoder, the difference between the original pixel data and the predicted pixel data, referred to as the residual, is transformed into the frequency domain, quantized and then entropy coded before being transmitted together with necessary prediction parameters, such as, for example, prediction mode and motion vectors, which are also entropy coded. The decoder performs entropy decoding, inverse quantization and inverse transformation to obtain the residual, and then adds the residual to an intra or inter prediction to reconstruct a picture.

MPEG and ITU-T are working on the successor to HEVC within the Joint Video Experts Team (JVET). The name of this video codec under development is Versatile Video Coding (VVC). The current VVC draft, at the time of writing, is found in JVET document JVET-N1001-V7.

1.2 NAL Units

Both HEVC and VVC define a Network Abstraction Layer (NAL). All the data (i.e., both Video Coding Layer (VCL) data or non-VCL data) in HEVC and VVC is encapsulated in NAL units. A VCL NAL unit contains data that represents sample values. A non-VCL NAL unit contains additional associated data such as parameter sets and supplemental enhancement information (SEI) messages.

The NAL unit in HEVC begins with a NAL unit header (or simply "header" for short) that specifies i) the NAL unit type of the NAL unit, which identifies what type of data is carried in the NAL unit, ii) a layer id to which the NAL unit belongs, and iii) the temporal ID to which the NAL unit belongs. The NAL unit type is encoded in the nal_unit_type codeword in the NAL unit header, and the NAL unit type indicates and defines how the NAL unit should be parsed and decoded. The rest of the bytes of the NAL unit is payload of the type indicated by the NAL unit type. A bitstream consists of a series of NAL units. The syntax for the NAL unit header for HEVC is shown in table 1:

TABLE 1

| (HEVC NAL unit header syntax) | |
| --- | --- |
| | Descriptor |
| nal_unit_header( ) { | |
| forbidden_zero_bit | f(1) |
| nal_unit_type | u(6) |
| nuh_layer_id | u(6) |
| nuh_temporal_id_plus1 | u(3) |
| } | |

The first byte of each NAL unit in HEVC contains the nal_unit_type syntax element (a.k.a., codeword). A decoder or bitstream parser can conclude how the NAL unit should be handled, e.g. parsed and decoded, after looking at the first byte and determining the NAL unit type value encoded in the nal_unit_type codeword.

In VVC, the NAL unit type is signaled differently, but the NAL unit header in VVC contains information for the decoder to derive the NAL unit type of the NAL unit. The NAL unit types of the current version of the VVC draft, JVET-N1001-v7, is shown in table 2 below.

The decoding order is the order in which NAL units shall be decoded, which is the same as the order of the NAL units within the bitstream. The decoding order may be different from the output order, which is the order in which decoded pictures are to be output, such as for display. by the decoder.

TABLE 2

| NAL unit types in the current version of the WC draft | | | |
| --- | --- | --- | --- |
| NalUnitType | Name of NalUnitType | Content of NAL unit and RBSP syntax structure | NAL unit type class |
| 0 | PPS_NUT | Picture parameter set pic_parameter_set_rbsp( ) | non-VCL |
| 1 | AUD_NUT | Access unit delimiter access_unit_delimiter_rbsp( ) | non-VCL |
| 2 3 | PREFIX_SEI_ NUT SUFFIX_SEI_ NUT | Supplemental enhancement information sei_rbsp( ) | non-VCL |
| 4 | APS_NUT | Adaptation parameter set adaptation_parameter_set_rbsp( ) | non-VCL |
| 6 5..7 | RSV_NVCL65.. RSV_NVCL7 | Reserved | non-VCL |
| 8 | TRAIL_NUT | Coded slice of a non-STSA trailing picture slice_layer_rbsp( ) | VCL |

TABLE 2-continued

| | Name of NalUnitType | Content of NAL unit and RBSP syntax structure | NAL unit type class |
|---|---|---|---|
| NalUnitType | | | |
| 9 | STSA_NUT | Coded slice of an STSA picture slice_layer_rbsp( ) | VCL |
| 10 | RADL_NUT | Coded slice of a RADL picture slice_layer_rbsp( ) | VCL |
| 11 | RASL_NUT | Coded slice of a RASL picture slice_layer_rbsp( ) | VCL |
| 12..15 | RSV_VCL_12.. RSV_VCL_15 | Reserved non-IRAP VCL NAL unit types | VCL |
| 16 | DPS_NUT | Decoding parameter set decoding_parameter_set_rbsp( ) | non-VCL |
| 17 | SPS_NUT | Sequence parameter set seq_parameter_set_rbsp( ) | non-VCL |
| 18 | EOS_NUT | End of sequence end_of_seq_rbsp( ) | non-VCL |
| 19 | EOB_NUT | End of bitstream end_of_bitstream_rbsp( ) | non-VCL |
| 20 | VPS_NUT | Video parameter set video_parameter_set_rbsp( ) | non-VCL |
| 21..23 | RSV_NVCL21.. RSV_NVCL23 | Reserved | non-VCL |
| 24 | IDR_W_RADL | Coded slice of an IDR picture | VCL |
| 25 | IDR_N_LP | slice_layer_rbsp( ) | |
| 26 | CRA_NUT | Coded slice of a CRA picture slice_layer_rbsp( ) | VCL |
| 27 | GRA_NUT | Coded slice of a gradual random access picture slice_layer_rbsp( ) | VCL |
| 28..31 | UNSPEC28.. UNSPEC31 | Unspecified | non-VCL |

1.3 Temporal Layers

In HEVC, all pictures are associated with a TemporalId value that specifies the temporal layer to which the picture belongs. TemporalId values are decoded from the nuh_temporal_id_plus1 syntax element in the NAL unit header. In HEVC, the encoder is required to set TemporalId values such that pictures belonging to a lower layer are perfectly decodable when higher temporal layers are discarded. Assume for instance that an encoder has output a bitstream using temporal layers 0, 1 and 2. Then removing all layer 2 NAL units or removing all layer 1 and 2 NAL units will result in bitstreams that can be decoded without any problems. This is ensured by restrictions in the HEVC specification with which the encoder must comply. For instance, it is not allowed for a picture of a temporal layer to reference a picture of a higher temporal layer.

1.4 The STSA Picture

In HEVC (and in the current VVC draft), there is a picture type called the step-wise temporal sub-layer access (STSA)

picture. There are two types of STSA pictures in HEVC, STSA_R, which is an STSA picture that is also a reference picture, and STSA_N, which is an STSA picture that is a non-reference picture. In the current VVC draft only one type of STSA picture is specified and no distinction is made as to whether the STSA picture is a reference or non-reference picture.

The STSA picture is intended to indicate a position in the bitstream where it is possible to "up-switch" temporal layers—i.e., switch from a lower temporal layer to a higher temporal layer. For example, a decoder may decode temporal layer N which means that all NAL units with a TemporalId equal to or lower than N are decoded and all NAL units with a TemporalId higher than N are ignored. If there is an STSA picture having a TemporalId of N+1, then the decoder is ensured to be able to decode that STSA picture and all NAL units that follow the STSA picture in decoding order having a TemporalId equal to or lower than N+1.

The temporal layer up-switching feature explained above is enabled by the following three main restrictions in HEVC regarding STSA pictures, listed and explained in Table 3.

TABLE 3

HEVC STSA pictures

| Restriction text | Explanation |
|---|---|
| When nuh_layer_id is equal to 0 and nal_unit_type is equal to STSA_R or STSA_N, TemporalId shall not be equal to 0. | Forbids STSA pictures to belong to temporal layer 0 since there is no temporal layer-1 to switch from. |
| When the current picture is a step-wise temporal sub-layer access (STSA) picture, there shall be no picture included in RefPicSetStCurrBefore, RefPicSetStCurrAfter or RefPicSetLtCurr that has TemporalId equal to that of the current picture. | Forbids the STSA picture to reference pictures of the same temporal layer that precede the STSA picture in decoding order. |

TABLE 3-continued

| HEVC STSA pictures | |
| --- | --- |
| Restriction text | Explanation |
| When the current picture is a picture that follows, in decoding order, an STSA picture that has TemporalId equal to that of the current picture, there shall be no picture that has TemporalId equal to that of the current picture included in RefPicSetStCurrBefore, RefPicSetStCurrAfter or RefPicSetLtCurr that precedes the STSA picture in decoding order. | Forbids pictures following the STSA picture in decoding order to use pictures preceding the STSA picture in decoding order for prediction when a preceded picture belongs to the same temporal layer as the STSA picture. |

1.5 The TSA Picture

HEVC also specifies a temporal sub-layer access (TSA) picture. Like STSA pictures, there are two types of TSA pictures in HEVC, TSA_R, which is a TSA picture that is also a reference picture, and TSA_N, which is a TSA picture that is a non-reference picture. The TSA picture is not specified in the current VVC draft.

Like the STSA picture, the TSA picture is intended to indicate a position in the bitstream where it is possible to up-switch from a lower temporal layer to a higher temporal layer, but in contrast to the STSA picture for which only one immediate layer may be added for each STSA picture, the TSA picture indicates that it is possible to switch up to any higher layer.

1.6 Intra Random Access Point (IRAP) Pictures and the Coded Video Sequence (CVS)

For single layer coding in HEVC, an access unit (AU) is the coded representation of a single picture. An AU may consist of several video coding layer (VCL) NAL units as well as non-VCL NAL units.

An Intra random access point (IRAP) picture in HEVC is a picture that does not refer to any pictures other than itself for prediction in its decoding process. The first picture in the bitstream in decoding order in HEVC must be an IRAP picture but an IRAP picture may additionally also appear later in the bitstream. HEVC specifies three types of IRAP pictures: i) the broken link access (BLA) picture, ii) the instantaneous decoder refresh (IDR) picture, and iii) the clean random access (CRA) picture.

A coded video sequence (CVS) is a series of access units starting at an IRAP access unit up to, but not including the next IRAP access unit in decoding order. In VVC, there is also the GRA picture which may start a CVS without an Intra picture.

IDR pictures always start a new CVS. A CRA picture may have associated RADL or RASL pictures. A CRA picture may contain syntax elements that specify a non-empty set of reference pictures. A CRA may or may not start a CVS.

1.7 Parameter Sets

HEVC specifies three types of parameter sets: i) the picture parameter set (PPS), ii) the sequence parameter set (SPS), and iii) the video parameter set (VPS). The PPS contains data that is common for a whole picture, the SPS contains data that is common for a coded video sequence (CVS), and the VPS contains data that is common for multiple CVSs.

The TemporalId of a VPS and SPS shall be equal to 0 in HEVC. The TemporalId of a PPS shall be equal to or greater than the TemporalId of the picture in the same access unit as the PPS.

In VVC there is also the adaptation parameter set (APS) and the decoding parameter set (DPS). The APS may contain information that can be used for multiple slices and two slices of the same picture can use different APSes. In the current VVC draft, the APS may contain ALF parameters or reshaper parameters. The DPS consist of information specifying the "worst case" in terms of profile and level that the decoder will encounter in the entire bitstream.

VVC has inherited the rule that the TemporalId of a PPS shall be equal to or greater than the TemporalId of the picture in the same access unit as the PPS. The APS shall in VVC have a TemporalId equal to the TemporalId of the picture in the same access unit.

1.8 Tiles and Bricks

The draft VVC video coding standard includes a tool called tiles that divides a picture into rectangular spatially independent regions. Tiles in the draft VVC coding standard are similar to the tiles used in HEVC, but with a two-step partitioning mechanism. Using tiles, a picture in VVC can be partitioned into rows and columns of samples where a tile is an intersection of a row and a column. For example, a picture may be divided into 4 tile rows and 5 tile columns resulting in a total of 20 tiles for the pictures.

The tile structure is signaled in a PPS by specifying the thicknesses of the rows and the widths of the columns. Individual rows and columns can have different sizes, but the partitioning always spans across the entire picture, from left to right and top to bottom respectively.

There is no decoding dependency between tiles of the same picture. This includes intra prediction, context selection for entropy coding and motion vector prediction. One exception is that in-loop filtering dependencies are generally allowed between tiles.

The two-step tile partitioning in VVC starts by partitioning the picture into tiles as in HEVC. Then each tile can be optionally partitioned into bricks by horizontal boundaries. In the current VVC specification draft, the word brick is used also for tiles which are not further partitioned into bricks.

1.9 Slices

The concept of slices in HEVC divides the picture into independently coded slices, where decoding of one slice in a picture is independent of other slices in the same picture. Different coding types could be used for slices of the same picture—i.e., a slice could be an I-slice, P-slice, or B-slice. The main purpose of slices is to enable resynchronization in case of data loss.

In the current version of VVC, a slice consists of either a number of complete tiles or only a consecutive sequence of complete bricks of one tile.

1.10 Reference Picture Management

Pictures in HEVC are identified by their picture order count (POC) values, also known as full POC values. Each slice contains a codeword, pic_order_cnt_lsb, that shall be the same for all slices in a picture. pic_order_cnt_lsb is also known as the least significant bits (lsb) of the full POC since it is a fixed-length codeword and only the least significant bits of the full POC is signaled. Both encoder and decoder keep track of POC and assign POC values to each picture that is encoded/decoded. The pic_order_cnt_lsb can be signaled by 4-16 bits. There is a variable MaxPicOrderCntLsb used in HEVC which is set to the maximum pic_order_cnt_lsb value plus 1. This means that if 8 bits are used to signal pic_order_cnt_lsb, the maximum value is 255 and MaxPicOrderCntLsb is set to $2^8=256$. The picture order count value of a picture is called PicOrderCntVal in HEVC. Usually, PicOrderCntVal for the current picture is simply called PicOrderCntVal.

Reference picture management in HEVC is done using reference pictures sets (RPS). The RPS is a set of reference pictures that is signaled in the slice headers. When the decoder has decoded a picture, it is put together with its POC value in a decoded picture buffer (DPB). When decoding a subsequence picture, the decoder parses the RPS syntax from the slice header and constructs lists of reference picture POC values. These lists are compared with the POC values of the stored pictures in the DPB and the RPS specifies which pictures in the DPB to keep in the DPB and which pictures to remove. All pictures that are not included in the RPS are marked for removal from the DPB. A picture that is kept in the DPB is marked either as a short-term reference pictures or as a long-term reference picture according to the decoded RPS information.

One main property of the HEVC reference picture management system is that the status of the DPB as it should be before the current picture is decoded is signaled for every slice. This enables the decoder to compare the signaled status with the actual status of the DPB and determine if any reference picture is missing.

The reference picture management in the draft VVC specification differs slightly from the one in HEVC. In HEVC, the RPS is signaled and the reference picture lists to use for Inter prediction is derived from the RPS. In the draft VVC specification, the reference picture lists (RPLs) are signaled and the RPS is derived. However, in both specifications, signaling of what pictures to keep in the DPB, what pictures should be short-term and long-term is done. Using POC for picture identification and determination of missing reference pictures is done the same in both specifications.

1.11 HEVC Scalable and Multi-View Extensions

HEVC specifies a few extensions including the Scalable HEVC (SHVC) extension and the Multiview HEVC (MV-HEVC) extension.

SHVC provides support for spatial, SNR, and color gamut scalability on top of the temporal scalability already provided by the first version of HEVC. SHVC defines a base layer and one or more scalable enhancement layers. The layer id is decoded from the layer_id codeword in the NAL unit header. The base layer always has layer id equal to 0 while the scalable enhancement layers have a layer id larger than 0. To decode an enhancement layer, the referenced layers must first be decoded, i.e. referenced base layer pictures and potentially other referenced enhancement layer pictures. With spatial scalability it is possible for a layer with higher resolution to predict from a layer with lower resolution. SNR scalability allows a layer with a higher quality to predict from a layer with lower quality while color gamut scalability provides an extended color gamut in the scalable enhancement layer.

MV-HEVC provides support for coding multiple views with inter-layer prediction. Each view in MV-HEVC is identified with the layer_id codeword in the NAL unit header.

SUMMARY

Certain challenges exist. For example, the STSA picture and the restrictions specified in the VVC specification do not guarantee that up-switching works fine in all cases because there is nothing preventing a VVC bitstream from allowing an STSA picture (and pictures that follow the STSA picture in decoding order) to use an APS that preceded the STSA picture in decoding order and that has the same temporal layer as the STSA picture. This is also the case with PPSes, prefix SEI messages, and any not-yet-defined NAL unit preceding the first STSA NAL unit in the access unit in which the STSA picture is located.

As another example, in VVC the up-switching indication is designed as a VCL NAL unit type and it can be anticipated that it will be common for VVC access units to contain at least one APS containing data to be used by the picture in the access unit. If APSes have to precede VCL NAL units and the up-switching indication is put with the VCL NAL unit (which is the case for VVC and HEVC STSA pictures), a decoder can't perform the up-switch at the VCL NAL unit since that would lead to the APS not being decoded.

This disclosure, therefore, proposes one embodiment in which restrictions on the bitstream are added such that an encoder is not allowed to let an up-switching picture of layer N (nor pictures following the up-switching picture) use any PPS, APS, etc. of layer N that precedes the access unit containing the up-switching picture in decoding order. That is, in one embodiment, the up-switching is done in the granularity of access units, such that all NAL units belonging to the access unit of the STSA picture are decoded when an up-switch takes place.

According to a first aspect of the present disclosure, there is provided a method for decoding a set of pictures from a bitstream. The method comprises obtaining a layer access, LA, indication identifying an LA picture in an access unit, wherein i) the LA picture has a layer identifier value that identifies a layer and ii) the LA picture is followed by other pictures in a decoding order. The method further comprises determining, based on the LA indication, an LA position in the bitstream. The method comprises decoding the LA picture and the other pictures following the LA picture in the decoding order, wherein no parameter set that: a) has a particular type, b) has a layer identifier value equal to the layer identifier value of the LA picture, and c) precedes the LA position is used for decoding the LA picture.

According to a second aspect of the present disclosure, there is provided a method for decoding a set of pictures from a bitstream. The method comprises obtaining a layer access, LA, indication identifying an LA picture in an access unit, wherein i) the LA picture has a layer identifier value that identifies a layer and ii) the LA picture is followed by at least one picture in a decoding order, wherein said picture following the LA picture has a layer identifier value that is equal to or greater than the layer identifier value of the LA picture. The method comprises determining, based on the LA indication, an LA position in the bitstream. The method further comprises determining that the LA picture or said picture following the LA picture uses a parameter set that: a) has a particular type, b) has a layer identifier value equal to the layer identifier value of the LA picture, and c) precedes the LA position. The method comprises, in response to determining that the LA picture or said picture following the LA picture in the decoding order uses said parameter set, determining that an error condition is present.

According to a third aspect of the present disclosure, there is provided a method for encoding a picture. The method comprises encoding a layer access, LA, picture, wherein the LA picture has a layer identifier value that identifies a layer. The method further comprises encoding an LA indication that indicates the LA picture such that the LA picture can be identified from the LA indication by a decoder, wherein an LA position in the bitstream can be identified based on the LA indication, wherein no parameter set that: a) has a particular type, b) has a layer identifier value equal to the layer identifier value of the LA picture, and c) precedes the LA position is used for encoding the LA picture.

According to a fourth aspect of the present disclosure, there is provided a video decoder. The video decoder is adapted to obtain a layer access, LA, indication identifying an LA picture in an access unit, wherein i) the LA picture has a layer identifier value that identifies a layer and ii) the LA picture is followed by other pictures in decoding order. The video decoder is further adapted to determine, based on the LA indication, an LA position in the bitstream. The video decoder is adapted to decode the LA picture and the other pictures following the LA picture in decoding order, wherein no parameter set that: a) has a particular type, b) has a layer identifier value equal to the layer identifier value of the LA picture, and c) precedes the LA position is used for decoding the LA picture.

According to a fifth aspect of the present disclosure, there is provided a video decoder. The video decoder is adapted to obtain a layer access, LA, indication identifying an LA picture in an access unit, wherein i) the LA picture has a layer identifier value that identifies a layer and ii) the LA picture is followed by at least one picture in decoding order, wherein said picture following the LA picture has a layer identifier value that is equal to or greater than the layer identifier value of the LA picture. The video decoder is adapted to determine, based on the LA indication, an LA position in the bitstream. The video decoder is further adapted to determine whether the LA picture or said picture following the LA picture uses a parameter set that: a) has a particular type, b) has a layer identifier value equal to the layer identifier value of the LA picture, and c) precedes the LA position. The video decoder is further adapted to, in response to determining that the LA picture or said picture following the LA picture in decoding order uses said parameter set, determine that an error condition is present.

According to a sixth aspect of the present disclosure, there is provided a video encoder. The video encoder is adapted to encode a layer access, LA, picture, wherein the LA picture has a layer identifier value that identifies a layer. The video encoder is further adapted to encode an LA indication that indicates the LA picture such that the LA picture can be identified from the LA indication by a decoder, wherein an LA position in the bitstream can be identified based on the LA indication, wherein no parameter set that: a) has a particular type, b) has a layer identifier value equal to the layer identifier value of the LA picture, and c) precedes the LA position is used for encoding the LA picture.

According to a seventh aspect of the present disclosure, there is provided a computer program comprising instructions which, when executed by processing circuitry, causes the processing circuitry to perform the method according to the first or the second aspect.

According to an eighth aspect of the present disclosure, there is provided a carrier containing the computer program according to the fifth aspect, wherein the carrier is one of an electronic signal, an optical signal, a radio signal, and a computer readable storage medium (942).

Advantageously, the proposed up-switching indication mechanisms guarantee that all necessary data needed for decoding pictures after the up-switch is provided to the decoder. For example, the proposed mechanism also allows an encoder to use APS data preceding an STSA VCL NAL unit in decoding order when decoding the STSA picture (and pictures that follow the STSA picture in decoding order) even when the APS data belongs to the same temporal layer as the STSA picture, provided that the APS data is put in the same access unit as the STSA picture.

BRIEF DESCRIPTION OF THE DRAWINGS

FIG. 3 illustrates a bitstream.

FIG. 4 is a flowchart illustrating a decoding process according to an embodiment.

FIG. 5 is a flowchart illustrating a decoding process according to an embodiment.

FIG. 6 is a flowchart illustrating a decoding process according to an embodiment.

FIG. 7 is a flowchart illustrating a decoding process according to an embodiment.

FIG. 8 is a flowchart illustrating an encoding process according to an embodiment.

DETAILED DESCRIPTION

The embodiments described herein can be used in a video encoder or a video decoder.

In the embodiments below, various methods are described. It is to be understood by a person skilled in the art that two or more embodiments, or parts of embodiments, may be combined to form new solutions which are still covered by the invention described in this disclosure. Some of the embodiments below refer to different layers and their identifiers. The layers in the described solution may be, for example, temporal layers, spatial layers, quality layers, view layers, any other type of layers and combinations of different layer types. An encoder or decoder keeps track of coded data by layer identifiers. Typically, the label identifiers consist of one or more syntax elements for chunks of coded data where the syntax elements express an integer representing the layer identity. The embodiments below use "layer id" and "layer identifier" for the same thing.

In this description, "used for decoding" or "used for encoding" means that data earlier in the bitstream is referred to and used in the decoding/encoding process. For instance, a parameter set used for encoding a picture may be interpreted as the parameter set precedes the picture in the bitstream and that the decoding process of the picture uses data from the parameter set such that the picture may not be possible to decode for a decoder if the parameter set is not available and decoded by the decoder prior to decoding of the picture.

Figure 1:
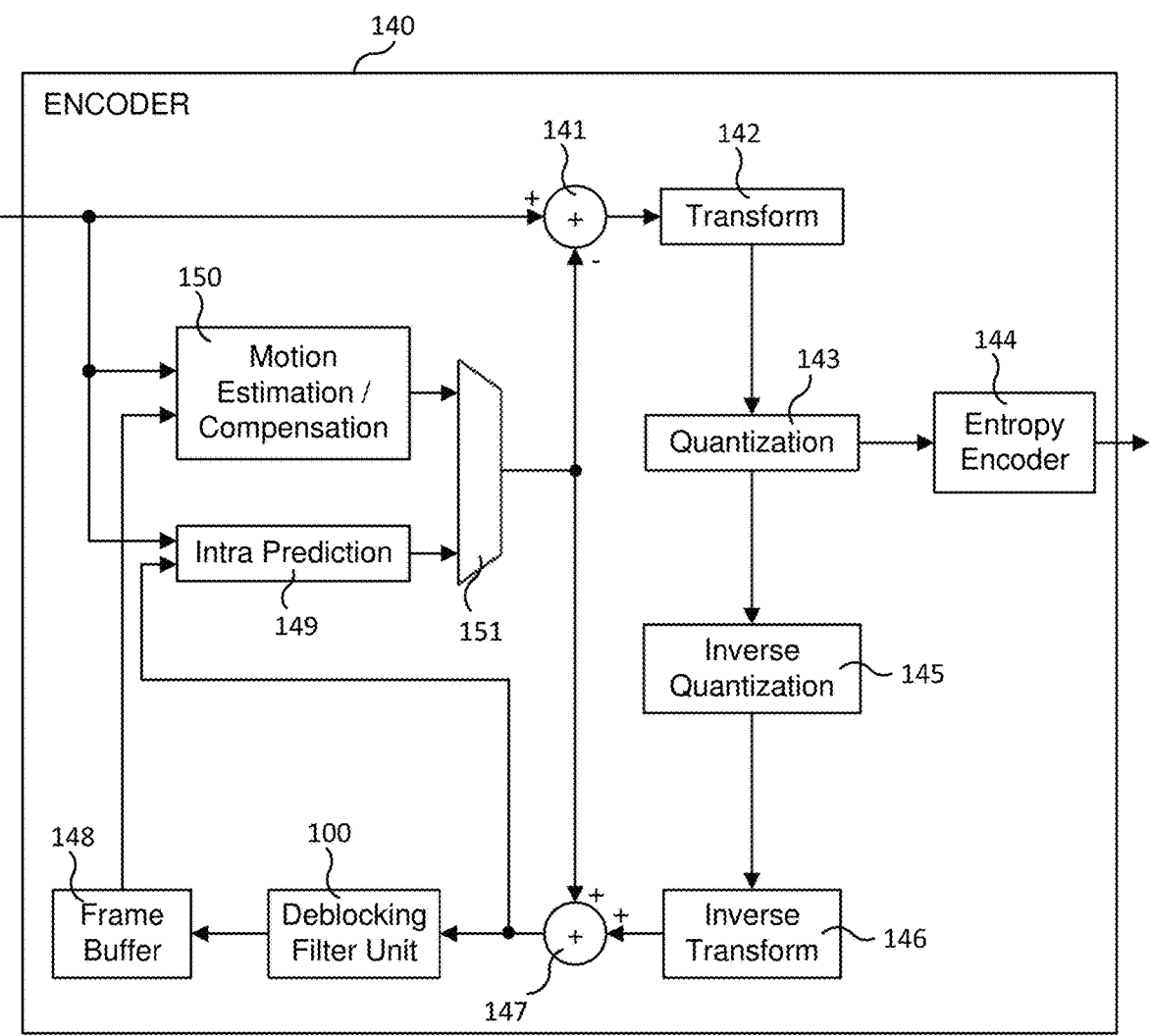
FIG. 1 is a schematic block diagram of a video encoder according to one embodiment.

FIG. 1 is a schematic block diagram of a video encoder 140 according to one embodiment. A current block of pixels is predicted by performing a motion estimation using motion estimator 150 from an already provided block of pixels in the same frame or in a previous frame. The result of the motion estimation is a motion or displacement vector associated with the reference block, in the case of inter prediction. The motion vector may be used by motion compensator 150 to output an inter prediction of the block of pixels. Intra predictor 149 computes an intra prediction of the current block of pixels. The outputs from the motion estimator/compensator 150 and the intra predictor 149 are input in selector 151 that either selects intra prediction or inter prediction for the current block of pixels. The output from the selector 151 is input to an error calculator in the form of adder 141 that also receives the pixel values of the current block of pixels. Adder 141 calculates and outputs a residual error as the difference in pixel values between the block of pixels and its prediction. The error is transformed in transformer 142, such as by a discrete cosine transform, and quantized by quantizer 143 followed by coding in encoder 144, such as by entropy encoder. In inter coding, also the estimated motion vector is brought to encoder 144 to generate the coded representation of the current block of pixels. The transformed and quantized residual error for the current block of pixels is also provided to an inverse quantizer 145 and inverse transformer 146 to retrieve the original residual error. This error is added by adder 147 to the block prediction output from the motion compensator 150 or intra predictor 149 to create a reference block of pixels that can be used in the prediction and coding of a next block of pixels. This new reference block is first processed by a deblocking filter 100. The processed new reference block is then temporarily stored in frame buffer 148, where it is available to intra predictor 149 and motion estimator/compensator 150.

Figure 2:
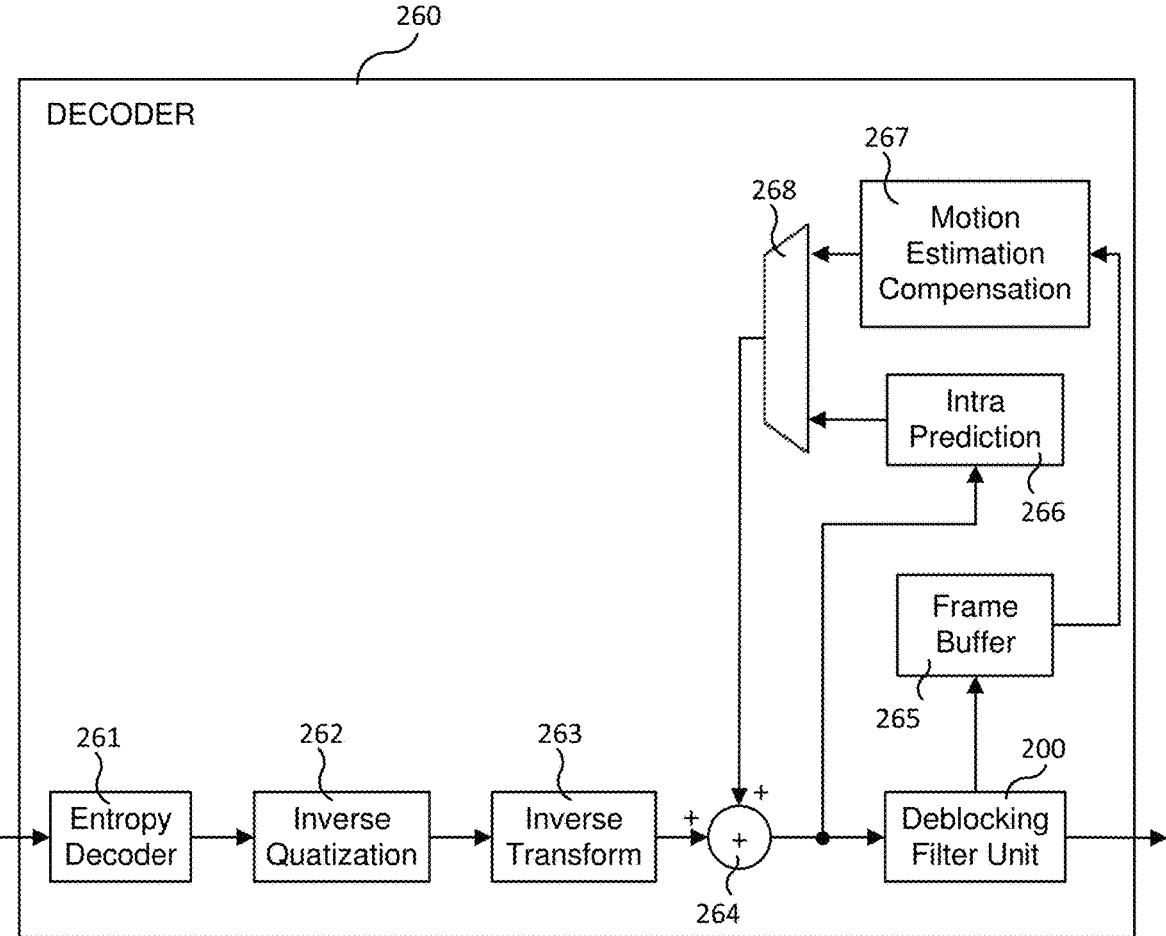
FIG. 2 is a schematic block diagram of a video decoder according to one embodiment.

FIG. 2 is a block diagram of a video decoder 260 according to some embodiments. Decoder 260 includes decoder 261, such as entropy decoder, to decode an encoded representation of a block of pixels to get a set of quantized and transformed residual errors. These residual errors are dequantized by inverse quantizer 262 and inverse transformed by inverse transformer 263 to provide a set of residual errors. These residual errors are added by adder 264 to the pixel values of a reference block of pixels. The reference block is determined by a motion estimator/compensator 267 or intra predictor 266, depending on whether inter or intra prediction is performed. Selector 268 is thereby interconnected to adder 264 and motion estimator/compensator 267 and intra predictor 266. The resulting decoded block of pixels output form adder 264 is input to deblocking filter 200. The filtered block of pixels is output from decoder 260 and may be furthermore temporarily provided to frame buffer 265 to be used as a reference block of pixels for a subsequent block of pixels to be decoded. Frame buffer 265 is thereby connected to motion estimator/compensator 267 to make the stored blocks of pixels available to motion estimator/compensator 267. The output from adder 264 may also be input to intra predictor 266 to be used as an unfiltered reference block of pixels.

As noted above, certain challenges exist, such as the fact that restrictions specified in the VVC specification do not guarantee that up-switching works fine in all cases because there is nothing preventing a VVC bitstream from allowing an STSA picture (and pictures that follows the STSA picture in decoding order) to use an APS that preceded the STSA picture in decoding order and that has the same temporal layer as the STSA picture. This is also the case with PPSes, prefix SEI messages, and any not-yet-defined NAL unit preceding the first STSA NAL unit in the access unit in which the STSA picture is located.

FIG. 3 and Table 4, below, show a VVC bitstream 300 example using STSA pictures that illustrates the problem. There are three pictures in the example (i.e., pictures 301, 302, and 303), each in their own access unit. The first picture 301 is an IDR picture of temporal layer 0 and the two succeeding pictures (i.e., pictures 302 and 303) are both STSA pictures of temporal layer 1. Looking at access unit 2, the STSA B picture there uses PPS with ID=4 and APS with ID=8. However, up-switching at the STSA B picture means that no parameter set data of access unit 1 is decoded and since neither of the PPS with ID=4 nor the APS with ID=8 is decoded, the STSA B picture can't be decoded correctly.

TABLE 4

| | | STSA Example | | | |
|---|---|---|---|---|---|
| AU number | NAL unit number | NAL unit type | TemporalId | PPS id | APS id |
| 0 | 0 | DPS | 0 | — | — |
| 0 | 1 | VPS | 0 | — | — |
| 0 | 2 | SPS | 0 | — | — |
| 0 | 3 | PPS | 0 | 3 | — |
| 0 | 4 | APS | 0 | — | 7 |
| 0 | 5 | IDR_N_LP | 0 | 3 | 7 |
| 1 | 6 | PPS | 1 | 4 | — |
| 1 | 7 | APS | 1 | — | 8 |
| 1 | 8 | STSA | 1 | 4 | 8 |
| 2 | 9 | STSA | 1 | 4 | 8 |

Another problem noted above is that, in VVC, the up-switching indication is designed as a VCL NAL unit type and it can be anticipated that it will be common for VVC access units to contain at least one APS containing data to be used by the picture in the access unit. If APSes have to precede VCL NAL units and the up-switching indication is put with the VCL NAL unit (which is the case for VVC and HEVC STSA pictures), a decoder can't perform the up-switch at the VCL NAL unit since that would lead to the APS not being decoded. Looking at the example in FIG. 3 and Table 4, the STSA A picture uses PPS data with ID=4 and APS data with ID=8 that precede the STSA A picture in the bitstream. If the decoder is decoding temporal layer 0 only, finds an up-switching point as the first VCL NAL unit of the STSA A picture and starts decoding temporal layer 1 NAL units starting from the STSA A picture, then decoder will not decode the PPS nor the APS of access unit 1. This has the undesirable effect that STSA pictures can't refer to parameter sets in its own access unit.

1.0 LA Indication, LA Picture, LA Position and a Rule

In one embodiment, a layer up-switching indication is introduced. The layer up-switching indication is referred to herein as the layer access (LA) indication. In certain embodiments where an up-switch must be performed step-wise, the LA indication may be referred to as a "step-wise LA" (SLA) indication.

In HEVC, there is a step-wise temporal sub-layer access (STSA) picture and a temporal sub-layer access (TSA) picture, but in the embodiments described herein, the LA indication does not need to be a picture. Also, the HEVC STSA and TSA pictures indicate temporal layer up-switching, while the LA indication can be used for layers other than temporal layers. Another difference between HEVC and embodiments of this disclosure is that HEVC does not address parameter set availability for any of its two up-switching pictures: TSA and STSA.

In one embodiment an LA picture is associated with the LA indication. The LA picture is the first picture in a higher layer that the LA indication specifies can be decoded if an up-switch operation is performed on the bitstream. In one embodiment, the LA picture and the corresponding LA indication are placed together, for example in the same access unit in the bitstream. When this is the case, the decoder can identify the LA picture by first finding the LA indication and then derive the LA picture as the picture in the same access unit as the LA indication. That is, if the decoder finds an LA indication in an access unit, then the picture in that access unit is determined to the LA picture. In embodiments where there may be more than one picture in an access unit, each picture may have its own LA indication.

In one embodiment a position in the bitstream called the layer access (LA) position is introduced. In one embodiment, the LA position is derived from the position or placement of the LA indication in the bitstream. In another embodiment, the LA position is derived from a combination of the position or placement of the LA indication and one or more syntax elements in the bitstream.

In one embodiment a source layer and a target layer are derived. A decoder may for example decode layers 0, 1, and 2. The decoder may then find an LA indication in the bitstream that provides the decoder with information by which the decoder can derive a source layer id equal to 2 and a target layer id equal to 4. This means that since the decoder is decoding layer 2, the decoder may perform an up-switch to layer 4. The decoder may alternatively perform an up-switch to layer 3 since no data of a higher layer is used for decoding any data of a lower layer. This means that an up-switch is possible to a layer that is equal to or lower than the derived target layer. However, if the decoder in the example would encounter an LA indication and derive a source layer id equal to 3 and a target layer id equal to 4, an up-switch is not possible since the decoder is not decoding layer 3.

In one embodiment, the target layer id is derived as the layer id value of the LA indication, for example as the layer id value of the NAL unit containing the LA indication or as the layer id value of the access unit containing the LA indication. In another embodiment, the target layer id is derived as the highest possible layer id value, for example either as the highest layer id value specified for the profile of the bitstream or as a maximum layer id value indicated by syntax elements in the bitstream, for example in a SPS, VPS or DPS. In yet another embodiment, the target layer id value is signaled by syntax elements associated with the LA indication. The target layer id value should be greater than the source layer id value.

In one embodiment, the source layer id is derived as the target layer id minus 1, for example as the layer id value of the LA indication minus 1. In another embodiment, the source layer id value is signaled by syntax elements associated with the LA indication.

In another embodiment a rule is introduced where the rule specifies that no data that: i) precedes the LA position and ii) has a layer id value greater than the source layer id value and lower than or equal to the target layer id value is allowed to be used when decoding the LA picture or the pictures following the LA picture in decoding order that have a layer id value greater than the source layer id value and lower than or equal to the target layer id value.

Accordingly, in one embodiment, a decoder may perform all or a subset of the steps of the following process 400 (see FIG. 4) to decode a set of pictures from a bitstream. Process 400 may begin with step s402.

Step s402 comprises the decoder obtaining an LA indication identifying an LA picture in an access unit, wherein the LA picture is followed by other pictures in decoding order.

Step s404 comprises the decoder determining, based on the LA indication (e.g., based solely on the LA indication or based at least in part on the LA indication), an LA position in the bitstream. For example, in one embodiment the LA position is determined based solely on the position of the LA indication in the bitstream. In another embodiment, the LA position is determined based on a position indicated by the LA indication.

Step s406 comprises the decoder determining, based on the LA indication, a source layer id and a target layer id.

Step s408 comprises the decoder decoding the LA picture and the pictures following the LA picture in decoding order, wherein no parameter set of a particular type that i) precedes the LA position and ii) has a layer identifier value greater than the source layer id and smaller than or equal to the target layer id is used for decoding any of the LA picture and the pictures following the LA picture in decoding order having a layer identifier value greater than the source layer id and smaller than or equal to the target layer id.

In some embodiments, the particular type is any type included in a set of one or more particular types, wherein the set of one or more particular types includes an adaptation parameter set (APS) type.

In some embodiments, the particular type is any type included in a set of one or more particular types, wherein the set of one or more particular types includes a picture parameter set (PPS) type.

In some embodiments, the particular type is any type included in a set of one or more particular types, wherein the set of one or more particular types includes an SEI message type.

In another one embodiment, a decoder may perform all or a subset of the steps of the following process 500 (see FIG. 5). Process 500 may begin with step s502.

Step s502 comprises the decoder obtaining an LA indication identifying an LA picture in an access unit, wherein the LA picture is followed by other pictures in decoding order.

Step s504, which is the same as step s404, comprises the decoder determining, based on the LA indication, an LA position in the bitstream.

Step s506 comprises the decoder determining, based on the LA indication, a source layer id and a target layer id.

Step s508 comprises the decoder determining that the LA picture (or a picture following the LA picture in decoding order with a layer identifier value greater than the source layer id and lower than or equal to the target layer id) uses a parameter set of a particular type that precedes the LA position and has a layer identifier value greater than the source layer id and lower than or equal to the target layer id.

Step s510 comprises the decoder, in response to the determination, determines that the bitstream is not compliant with a codec specification and may interpret that as a bit-error, loss of data or as a non-compliant bitstream or non-compliant encoder. The decoder may report the error, perform error concealment, or take other actions based on the knowledge that the bitstream is not compliant.

1.1 Target Layer ID Equals the Layer ID of LA Picture

In one embodiment, the target layer id is derived as equal to the layer id value of the LA picture and the source layer id is derived as the target layer id value minus 1. In such an embodiment, a rule can be expressed as: no data of the same layer as the LA picture that precedes the LA position is allowed to be used when decoding any of the LA picture or the pictures following the LA picture in decoding order that belong to the same layer as the LA picture. This rule can alternatively be expressed using the two following rules:

Rule 1: When the current picture is a picture that follows, in decoding order, an LA picture and the current picture and the LA picture have the same layer id, the current picture shall not use or refer to a parameter set that also has the same layer id and precedes the LA position corresponding to the LA picture (e.g. the first NAL unit in decoding order that belongs to the access unit of the LA picture).

Rule 2: When the current picture is an LA picture, the current picture shall not use or refer to a parameter set that has a layer id equal to that of the current picture and that precedes the LA position associated with the LA picture (e.g. the first NAL unit in decoding order that belongs to the access unit of the LA picture).

Accordingly, in one embodiment, a decoder may perform all or a subset of the steps of the following process 600 (see FIG. 6) to decode a set of pictures from a bitstream. Process 600 may begin with step s602.

Step s602 comprises the decoder obtaining an LA indication identifying an LA picture in an access unit, wherein i) the LA picture has a layer identifier value that identifies a layer and ii) the LA picture is followed by other pictures in decoding order.

Step s604, which is the same as step s404, comprises the decoder determining, based on the LA indication, an LA position in the bitstream.

Step s606 comprises the decoder decoding the LA picture and the pictures following the LA picture in decoding order, wherein no parameter set that: a) has a particular type, b) has a layer identifier value equal to the layer identifier value of the LA picture, and c) precedes the LA position is used for decoding the LA picture.

In some embodiments, no parameter set that: a) has a particular type, b) has a layer identifier value equal to the layer identifier value of the LA picture, and c) precedes the LA position is used for decoding any other picture that i) follows the LA picture in decoding order and ii) has a layer identifier value that is equal to the layer identifier value of the LA picture.

In some embodiments, no parameter set that: a) has a particular type, b) has a layer identifier value equal to the layer identifier value of the LA picture, and c) precedes the LA position is used for decoding any other picture that i) follows the LA picture in decoding order and ii) has a layer identifier value that is greater than the layer identifier value of the LA picture.

In some embodiments, no parameter set that: a) has a particular type, b) has a layer identifier value greater than the layer identifier value of the LA picture, and c) precedes the LA position is used for decoding the LA picture or any one of the other pictures following the LA picture in decoding order that has a layer identifier value that is equal to or greater than the layer identifier value of the LA picture.

In another one embodiment, a decoder may perform all or a subset of the steps of the following process 700 (see FIG. 7). Process 700 may begin with step s702.

Step s702 comprises the decoder obtaining an LA indication identifying an LA picture in an access unit, wherein i) the LA picture has a layer identifier value that identifies a layer and ii) the LA picture is followed by at least one picture in decoding order, wherein said picture following the LA picture has a layer identifier value that is equal to or greater than the layer identifier value of the LA picture.

In some embodiments, obtaining the LA indication comprises deriving the LA indication from a VCL NAL unit type.

In some embodiments, obtaining the LA indication comprises deriving the LA indication from a NAL unit type of a non-VCL NAL unit.

In some embodiments, obtaining the LA indication comprises deriving the LA indication from one or more syntax elements in a parameter set.

In some embodiments, obtaining the LA indication comprises deriving the LA indication from one or more syntax elements in a non-VCL NAL unit.

In some embodiments, obtaining the LA indication comprises deriving the LA indication from one or more syntax elements in an access unit delimiter NAL unit in the access unit.

In some embodiments, obtaining the LA indication comprises deriving the LA indication from one or more syntax elements in a prefix SEI message.

In some embodiments, obtaining the LA indication comprises: determining whether the access unit contains an access unit delimiter NAL unit; and deriving the LA indication from one or more syntax elements of the access unit delimiter NAL unit as a result of determining that the access unit contains the access unit delimiter NAL unit, otherwise deriving the LA indication from a VCL NAL unit. In such an embodiment, if the access unit contains an access unit delimiter NAL unit, then the LA position is derived as equal to the position of the access unit delimiter, otherwise the LA position is derived as equal to the position of the first VCL NAL unit in the access unit.

Step s704, which is the same as step s404, comprises the decoder determining, based on the LA indication, an LA position in the bitstream. In some embodiments, the LA position is derived as the position of the NAL unit containing the LA indication.

Step s706 comprises the decoder determining that the LA picture or said picture following the LA picture uses a parameter set that: a) has a particular type, b) has a layer identifier value equal to the layer identifier value of the LA picture, and c) precedes the LA position.

Step s708 comprises, in response to determining that the LA picture or said picture following the LA picture in decoding order uses said parameter set, determining that an error condition is present.

In some embodiments, determining that an error condition is present comprises the decoder determining that: i) a bit-error has occurred, ii) data has been lost, iii) the bitstream is a non-compliant bitstream, or iv) an encoder that generated the bitstream is a non-compliant encoder.

In some embodiments, process 700 further includes, the decoder, as a result of determining that the error condition is present, reporting the error condition and/or performing an error concealment operation.

In some embodiments, process 700 further includes the decoder determining that the LA picture or said picture following the LA picture uses a parameter set that: a) has a particular type, b) has a layer identifier value greater than the layer identifier value of the LA picture, and c) precedes the LA position; and in response to determining that the LA picture or said picture following the LA picture uses said parameter set, determining that an error condition is present.

In another one embodiment, an encoder may perform all or a subset of the steps of the following process 800 (see FIG. 8). Process 800 may begin with step s802.

Step s802 comprises the encoder encoding a LA picture, wherein the LA picture has a layer identifier value that identifies a layer.

Step s804 comprises the encoder encoding a LA indication that indicates the LA picture such that the LA picture can be identified from the LA indication by a decoder, wherein an LA position in the bitstream can be identified based on the LA indication, wherein no parameter set that: a) has a particular type, b) has a layer identifier value equal to the layer identifier value of the LA picture, and c) precedes the LA position is used for decoding the LA picture.

In some embodiments, process 800 further includes a step s806 in which the encoder encodes other pictures that follow the LA picture in a decoding order.

In some embodiments, no parameter set that: a) has a particular type, b) has a layer identifier value equal to the layer identifier value of the LA picture, and c) precedes the LA position is used for encoding any one of the other pictures following the LA picture in decoding order that has a layer identifier value that is equal to the layer identifier value of the LA picture.

In some embodiments, no parameter set that: a) has a particular type, b) has a layer identifier value equal to the layer identifier value of the LA picture, and c) precedes the LA position is used for encoding any one of the other pictures following the LA picture in decoding order that has a layer identifier value that is greater than the layer identifier value of the LA picture.

In some embodiments, process 800 further includes the encoder outputting (e.g., transmitting or storing) the LA picture, the LA indication that identifies the LA picture, and the other pictures that follow the LA picture in the decoding order.

1.2 Derivation of the LA Position

As noted above, the LA position is derived from the LA indication. For example, in one embodiment, the LA position is determined based on (e.g., based solely on or based partly on) the position the LA indication in the bitstream. In another embodiment, the LA position is determined based on a combination of the position the LA indication and one or more syntax elements in the bitstream.

In one embodiment, the LA position is determined to be the position of the first NAL unit in decoding order that belongs to the access unit of the picture containing the LA indication.

In another embodiment, the LA position is determined to be the position of the LA picture.

In another embodiment, the LA position is determined to be the position of the first VCL NAL unit of the LA picture in decoding order.

In another embodiment, the LA position is determined to be the position of the first NAL unit in decoding order in the access unit having a NAL unit type equal to a particular NAL unit type. The particular NAL unit type could for instance have a NAL unit type of LA, access unit delimiter, SPS, PPS, APS or SEI message.

In another embodiment, the LA position is determined to be the position of the first NAL unit in decoding order in the access unit having a NAL unit type equal to a NAL unit type of a defined set of NAL unit types where the set consists of at least two types. For example, the set of NAL unit types may consist of at least two of a PPS NAL unit type, an APS NAL unit type and an LA VCL NAL unit type. If all three types are included in the set and an access unit contains an LA VCL NAL unit type but none of the other NAL unit types in the set, the LA position is derived to be the position of the LA VCL NAL unit. But if an access unit contains all three types, the LA position is derived to be the position of the first one in decoding order in the access unit.

In some embodiments, the access unit comprises an ordered sequence of NAL units, and the LA position is determined to be the position of the first NAL unit in the ordered sequence of NAL units.

1.3 Parameter Set Details

As noted above, in various embodiments, no parameter set that: a) has a particular type, b) has a layer identifier value equal to the layer identifier value of the LA picture, and c) precedes the LA position is used for decoding the LA picture or any of the other pictures following the LA picture that have the same layer id as the LA picture.

In one embodiment, the particular type is any type included in a set of one or more particular types.

In one embodiment the set of one or more particular types includes an adaptation parameter set (APS) type. This means that, in this embodiment, no APS of the same layer as the LA picture that precedes the LA position is allowed to be used when decoding any of the LA picture and the pictures following the LA picture in decoding order that belong to the same layer as the LA picture.

In one embodiment the set of one or more particular types includes a picture parameter set (PPS). This means that no PPS that has the same layer id value as the LA picture that precedes the LA position is allowed to be used when decoding any of the LA picture and the pictures following the LA picture in decoding order that has the same layer id value as the LA picture.

In one embodiment the set of one or more particular types includes an SEI message. This means that no information in an SEI which has the same layer identifier value as the LA picture and precedes the LA position is allowed to be used when decoding any of the LA picture and the pictures following the LA picture in decoding order that has the same layer identifier value as the LA picture.

In one embodiment the set of one or more particular types includes at least three types: SEI message, PPS, and APS.

1.4 Position of the LA Indication in the Bitstream

A decoder (or other network node) may monitor the bitstream searching for an LA indication in order to determine where an up-switch is possible. The position of the LA indication and the LA position may or may not be the same position in the bitstream. But, as described above, the LA position is determined based on the LA indication.

In one embodiment, the LA position and the position of the LA indication are the same. For example, in one embodiment, the position of the LA indication is the position of the NAL unit that contains the LA indication and the LA position is determined to be the position of this NAL unit containing the LA indication. Thus, for example, a decoder would search for an LA indication in the bitstream, find the LA indication in a particular NAL unit (e.g., find a NAL unit whose NAL unit type value identifies a specific NAL unit type), and then set the LA position to the position of the particular NAL unit. In this way, for example, the LA position is based solely on the position of the LA indication.

In one embodiment, the LA indication is derived from a VCL NAL unit type. In one embodiment, the LA indication is derived from a non-VCL NAL unit type. Either an existing non-VCL NAL unit type is used to derive the LA indication, or a new NAL unit type not listed in table 2 is used.

If such a new NAL unit type would be introduced and used for VVC, it is possible that the STSA NAL unit type can be removed, and a new separate non-VCL NAL unit type is added. The RSV_NVCL5 NAL unit type in table 2 may for example be used and a decoder may find an LA indication as a NAL unit with RSV_NVCL5 and having a layer id value equal to the layer id value or temporal id value from the NAL unit header of the RSV_NVCL5 NAL unit. In one embodiment, the layer id value of the RSV_NVCL5 NAL unit is identical to the layer id of the picture in the same access unit as the RSV_NVCL5 NAL unit. In one embodiment the position of the RSV_NVCL5 NAL unit in the access unit is earlier than any APS, PPS, SEI message and VCL NAL unit in the access unit. A decoder or network node may derive the LA position as the position of the RSV_NVCL5 NAL unit.

In one embodiment, the LA indication is derived from an SEI message having a payload type for the LA indication. If such an SEI payload type would be introduced and used for VVC, then the STSA NAL unit type can be removed, and a new SEI message is added instead. A decoder may find an LA indication as an SEI message with the new payload type and having a layer id value equal to the layer id value or temporal id value from the NAL unit header of the SEI message NAL unit. In one embodiment, the layer id value of the SEI message is identical to the layer id of the picture in the same access unit as the SEI message. In one embodiment, the position of the SEI message in the access unit is earlier than any APS, PPS, other SEI messages and VCL NAL unit in the access unit. A decoder or network node may derive the LA position as the position of the SEI message with the payload type of the LA indication.

In one embodiment, the LA indication is derived from one or more syntax elements in a non-VCL NAL unit. There are several options where the LA indication may be placed and three of them are explained below.

(1) In one option, the LA indication is derived from one or more syntax elements in an access unit delimiter NAL unit. The access unit delimiter NAL unit is here assumed to be the first NAL unit in the access unit to which the access unit delimiter NAL unit belongs. The picture in the access unit is determined to be the LA picture. The one or more syntax elements may be a one-bit flag where one value of the flag (e.g., 1) specifies that the access unit delimiter carries an LA indication and the other value (e.g., 0) specifies that it does not. A decoder may find an LA indication as one value of a syntax element of an access unit delimiter and having a layer id value equal to the layer id value or temporal id value from the NAL unit header of the access unit delimiter. In one embodiment, the layer id value of the access unit delimiter NAL unit is identical to the layer id of the picture in the same access unit as the access unit delimiter. The LA position may be derived to be the position of the access unit delimiter.

(2) In a second option, the LA indication is derived from an SEI message having a payload type for the LA indication. If such a SEI payload type would be introduced and used for VVC, the STSA NAL unit type can be removed, and a new SEI message is added instead. A decoder may find an LA indication as an SEI message with the new specific payload type value and having a layer id value equal to the layer id value or temporal id value from the NAL unit header of the SEI message NAL unit. In one embodiment, the layer id value of the SEI message is identical to the layer id of the picture in the same access unit as the SEI message. In one embodiment the position of the SEI message in the access unit is earlier than any APS, PPS, other SEI message and VCL NAL unit in the access unit. A decoder may derive the LA position as the position of the SEI message with the payload type of the LA indication.

(3) In a third option, the LA indication is derived from one or more syntax elements in a parameter set. The syntax elements may be realized as a flag or as a type of the parameter set. For instance, there could be a flag in the APS that specifies whether the parameter set carries an LA indication or not. Similarly, there may be a flag in the PPS that specifies whether the parameter set carries an LA indication or not. If the flag specifies that the parameter set does carry an LA indication, the picture in the same access unit as the parameter set is determined to be the LA picture. A decoder or network node may find an LA indication as one value of a syntax element of a parameter set and having a layer id value equal to the layer id value or temporal id value from the NAL unit header of the parameter set. In one embodiment the layer id value of the parameter set is identical to the layer id of the picture in the same access unit as the parameter set. The LA position may be derived to be the position of the parameter set containing the LA indication. Alternatively, there may be two APS NAL unit types or two PPS NAL unit types where one type is an LA indication and the other type is not.

In one embodiment, the LA indication is derived as a flag in the NAL unit header. The presence of the flag may be conditioned on the NAL unit type; for example, the flag may be present when the NAL unit type indicates an access unit delimiter, or the flag may be present when the NAL unit type indicates a trailing picture NAL unit.

In one embodiment, the LA indication is derived from one or more syntax elements in a picture header, e.g. as a flag. There is no picture header in HEVC nor in the current VVC draft, but it has been discussed to specify a picture header for VVC which would contain information that is common for all slices in a picture.

An implementation on top of the current version of the VVC draft may look as follows where the added text is shown using italic text:

---

---- VVC draft text start ----- nal_unit_type_lsb specifies the least significant bits for the NAL unit type.

The variable NalUnitType, which specifies the NAL unit type, i.e., the type of RBSP data structure contained in the NAL unit as specified in Table 7-1, is derived as follows:

NalUnitType = ( zero_tid_required_flag << 4 ) + nal_unit_type_lsb (7-2)

. . .

*When the current access unit has a NalUnitType equal to STSA_NUT, the following applies:*

– *The current access unit shall not activate a PPS or use an APS that precedes the current access unit in decoding order and has TemporalId equal to the TemporalId of the current access unit.*

– *For any following access unit that has TemporalId equal to that of the current access unit and follows the current access unit in decoding order, the following access unit shall not activate a PPS or use an APS that has TemporalId equal to that of the current access unit that precedes the current access unit in decoding order.*

---- VVC draft text end -----

---

1.5 Combinations

In one embodiment, the LA indication may be derived from one or more syntax elements of an access unit delimiter NAL unit or from one or more syntax elements of a VCL NAL unit. For example, if the bitstream contains an access unit with an LA indication, all VCL NAL units in the access unit carry an LA indication. In addition, if the access unit with an LA indication contains an access unit delimiter NAL unit, the access unit delimiter NAL unit also carries an LA indication.

A network node (e.g., decoder or other network node) that searches or scans a bitstream for a particular up-switching indication may perform all or a subset of the following steps according to one embodiment.

1—Determine the target layer id value as the layer id value the network node is currently decoding plus 1 or determine the target layer id value as the layer id value the network node is currently forwarding plus 1.

2—For each NAL unit in decoding order, do the following:

2(a)—If the up switch has been done, decode or forward the NAL unit only if it has a layer id value equal to the target layer id value or lower;

2(b)—If the up switch has not been done and the NAL unit is an access unit delimiter, do the following:

2(b)(i) check one or more syntax elements in the access unit delimiter to determine whether the access unit delimiter contains an LA indication.

2(b)(ii) if it contains the LA indication, determine the layer id of the access unit delimiter from one or more syntax elements of the access unit delimiter, and check whether the layer id value is equal to the target layer id;

2(b)(iii) if the layer id value is equal to the target layer id, decode and/or forward, the access unit NAL unit and consider the up switch as done.

2(c) Otherwise, if the up switch has not been done and the NAL unit is a VCL NAL unit, do the following:

2(c)(i) check one or more syntax elements of the VCL NAL unit to determine whether the VCL NAL unit contains an LA indication.

2(c)(ii) If it contains an LA indication, determine the layer id of the VCL NAL unit from one or more syntax elements of the VCL NAL unit and check whether the layer id value is equal to the target layer id.

2(c)(iii) If the layer id value is equal to the target layer id, decode and/or forward the VCL NAL unit and consider the up switch as done.

In other words, the LA indication is derived by determining whether the access unit contains an access unit delimiter NAL unit wherein if the access unit contains an access unit delimiter NAL unit, then the LA indication is derived from one or more syntax elements of the access unit delimiter NAL unit, otherwise the LA indication is derived from a VCL NAL unit.

If the access unit contains an access unit delimiter NAL unit, then the LA position may be derived as equal to the position of the access unit delimiter, otherwise the LA position may be derived as equal to the position of the first VCL NAL unit in the access unit.

An implementation on top of the current version of the VVC draft may look as follows where the added text is shown using italic text:

VVC Draft Text Start

7.3.2.7 Access Unit Delimiter RBSP Syntax

| | Descriptor |
|---|---|
| access_unit_delimiter_rbsp( ) { | |
|     pic_type | u(3) |
|     stsa_picture_flag | u(1) |
|     rbsp_trailing_bits( ) | |
| } | | stsa_picture_flag indicates whether or not the access unit is a step-wise temporal sub-layer access (STSA) access unit.

When stsa_picture_flag of the access unit is equal to 1, the NalUnitType of the access unit shall be equal to STSA_NUT. When stsa_picture_flag of the access unit is equal to 0, the NalUnitType of the access unit shall not be equal to STSA_NUT nal_unit_type_lsb specifies the least significant bits for the NAL unit type.

The variable NalUnitType, which specifies the NAL unit type, i.e., the type of RBSP data structure contained in the NAL unit, is derived as follows:

NalUnitType=(zero_tid_required_flag<<4)+nal_unit_type_lsb

. . .

When the current access unit has a NalUnitType equal to STSA_NUT, the following applies:

If an access unit delimiter NAL unit is present in the current access unit, stsa_picture_flag shall be equal to 1 and the variable StsaFirstNalUnit of the current access unit is set equal to the access unit delimiter NAL unit. If an access unit delimiter NAL unit is not present in the current access unit, the variable StsaFirstNalUnit of the current access unit is set equal to the first VCL NAL unit of the current access unit.

The current access unit shall not activate a PPS or use an APS that precedes StsaFirstNalUnit of the current access unit in decoding order and has TemporalId equal to the TemporalId of the current access unit.

For any following access unit that has TemporalId equal to that of the current access unit and follows the current access unit in decoding order, the following access unit shall not activate a PPS or use an APS that has TemporalId equal to that of the current access unit that precedes the StsaFirstNalUnit of the current access unit in decoding order.

*VVC Draft Text End*

1.6 Multiple LA Indications

In one embodiment, there are at least three LA indications that are derived as follows. The first is derived from one or more syntax elements of a VCL NAL unit. The second is derived from one or more syntax elements of an APS NAL unit. The third is derived from one or more syntax elements of a PPS NAL unit. If an access unit carries an LA indication, all VCL NAL units must carry an LA indication. If the access unit contains an APS, that APS must also carry an LA indication. Similarly, if the access unit contains a PPS, that PPS must also carry an LA indication. If the access unit does not carry an LA indication, no NAL unit in the access unit shall carry an LA indication.

A network node (e.g., decoder) will then look for LA indications in APS, PPS and VCL NAL units. When the first LA indication in decoding order is found for which the NAL unit in which the LA indication is found has a layer id value equal to the target layer id, the decoder starts decoding (or the network node starts forwarding) the target layer NAL units.

In this embodiment, the LA position may be derived as the position of the NAL unit in which the LA indication is found.

1.7 Additional Variants

In one embodiment the layer identifier is a temporal layer identifier, a scalable or multi-view layer identifier.

In one embodiment, there is a flag in a parameter set, such as the SPS, that specifies whether there are LA indications in the CVS or not. One value of the flag specifies that there are no LA indications in the CVS. Another value of the flag specifies that there may be LA indications in the CVS.

For example, in one embodiment, a first parameter set (e.g., SPS or PPS) in the bitstream includes information (e.g., a flag) that specifies that there are no LA indications in a first CVS in the bitstream and a second parameter set in the bitstream includes information (e.g., a flag) that specifies that a second CVS in the bitstream may contain LA indications.

1.8 One Indication for a Group of LA Positions and Pictures

In this embodiment, the LA indication may be derived from one or more syntax elements in a parameter set such as a flag in the SPS or VPS and the LA indication is used to derive a number of LA positions in the bitstream such that the first NAL unit of the access units in the bitstream with e.g. specific NAL unit types or specific layer id values or a combination of a specific NAL unit type and a specific Layer id are derived as the LA positions in the bitstream and the pictures in those access units in the bitstream are derived as LA pictures.

In a version of this embodiment, one or more codewords in a parameter set indicate the LA positions in the bitstream as equal to the first NAL unit in decoding order in the access units having a layer id equal to a particular layer id. In one example for this variant, an encoder setting a flag in the SPS to a particular value and signaling a particular layer id using syntax element values will indicate that the layer up switching is allowed for all the access units in the bitstream that have a layer id equal to that particular layer id. Similarly, a decoder decoding the flag to a particular value and decoding syntax elements representing a particular layer id indicates to the decoder that layer up-switching is allowed for all access units of that particular layer id value. A decoder may perform up-switching from a particular layer to a higher layer at a picture that has a layer id equal to the particular layer id.

1.9 Explicitly Specify the Target Layers that the Decoder May Up-Switch to

An up-switch does not need to be performed step-wise, i.e. increment of one layer only. In such an embodiment, it may be explicitly specified to which temporal layer it is possible to up-switch to—i.e., what the possible target layers are. The set of target layers may be defined by a specific rule or be indicated by one or more syntax elements in the bitstream, for instance in an access unit delimiter, in a new LA non-VCL NAL unit, or in an SEI message.

The one or more syntax elements may for instance indicate, like the TSA picture in HEVC, that it is possible to switch up to the maximum layer—i.e. the highest layer in the bitstream.

In one embodiment, the one or more syntax elements indicate a maximum layer that the decoder may switch up to. For instance, if the bitstream comprises layers 0 to 5 and the decoder decodes layers 0 and 1, then the one or more syntax elements could indicate a maximum target layer of 4, meaning that the decoder may decode layers 0 to 4, but not 5. The one or more syntax elements may be a delta value relative to another layer, e.g. the layer of the LA indication, or may be the absolute maximum target layer.

In one example of this embodiment the maximum target layer is signaled in the access unit delimiter, where a flag (layer_access_indication_flag) indicates if LA is allowed, and if the flag indicates that LA is allowed then the access unit delimiter also contains information indicating the target layer to which LA is allowed. For example, the access unit delimiter may be defined as follows:

| | Descriptor |
|---|---|
| access_unit_delimiter_rbsp( ) { | |
|     pic_type | u(3) |
|     layer_access_indication_flag | u(1) |
|     if ( layer_access_indication_flag ) | |
|       max_target_layer_delta_minus1 | u(v) |
|     rbsp_trailing_bits( ) | |
| } | |
| layer_access_indication_flag indicates whether or not the access unit is a layer access (LA) access unit. | |
| max_target_layer_delta_minus1 plus 1 indicates the delta between nuh_layer_id of the access unit delimiter and the maximum target layer that may be up-switched to. | |
| The MaxTargetLayer is derived as: | |
|   MaxTargetLayer = nuh_layer_id + max_target_layer_delta_minus1 + 1 | |

In another example of this embodiment only the delta maximum target layer is signaled in the access unit delimiter, where a zero delta means that layer access up-switching is not allowed:

| | Descriptor |
|---|---|
| access_unit_delimiter_rbsp( ) { | |
|     pic_type | u(3) |
|     max_target_layer_delta | u(v) |
|     rbsp_trailing_bits( ) | |
| } | |
| max_target_layer_delta indicates the delta between nuh_layer_id of the access unit delimiter and the maximum target layer that may be up-switched to. | |
| max_target_layer_delta equal to 0 indicates that up-switching is not allowed. | |
| The MaxTargetLayer is derived as: | |
|     MaxTargetLayer = nuh_layer_id + max_target_layer_delta | |

In another example of this embodiment the delta maximum target layer is signaled in a particular non-VCL layer access (LA) NAL unit, where the presence of the particular NAL unit indicates that it is possible to up-switch and the maximum target layer is specified by an explicit codeword:

| | Descriptor |
|---|---|
| layer_access_indication_rbsp( ) { | |
|     max_target_layer_delta_minus1 | u(v) |
|     rbsp_trailing_bits( ) | |
| } | |
| max_target_layer_delta_minus1 plus 1 indicates the delta between nuh_layer_id of the access unit delimiter and the maximum target layer that may be up-switched to. | |
| The MaxTargetLayer is derived as: | |
|     MaxTargetLayer = nuh_layer_id + max_target_layer_delta_minus1 + 1 | |

In another variant of this embodiment, the one or more syntax elements could also define a sparse set of target layers that it is possible to up-switch to. For instance, if the bitstream comprises layers 0 to 5 and the decoder decodes layers 0 and 1, then the one or more syntax elements could indicate that it is possible to up-switch to target layers 3 and 5, meaning that the decoder may decode layers 0, 1, 3 and 5 but not 2 and 4.

1.10 Buffering Parameter Set(s)

In one embodiment, an access unit comprises a NAL unit that contains an LA indication and further comprises a NAL unit that contains a parameter set, and process 600 further comprises: the decoder receiving the NAL unit that contains the parameter set prior to receiving the NAL unit that contains the LA indication; and the decoder buffering (i.e., storing) the parameter set. In some embodiments, the LA position is the position in the bitstream of the NAL unit that contains the parameter set.

In one embodiment, the decoder may buffer a parameter set that is part of an access unit until it determines whether or not a picture in the access unit uses the parameter set. If the decoder determines that a picture in the access unit uses the parameter set, the decoder decodes the buffered parameter set and uses the decoded parameter set to decode the picture. If the decoder determines that no picture in the access unit uses the parameter set, the decoder discards the stored parameter set.

Figure 9:
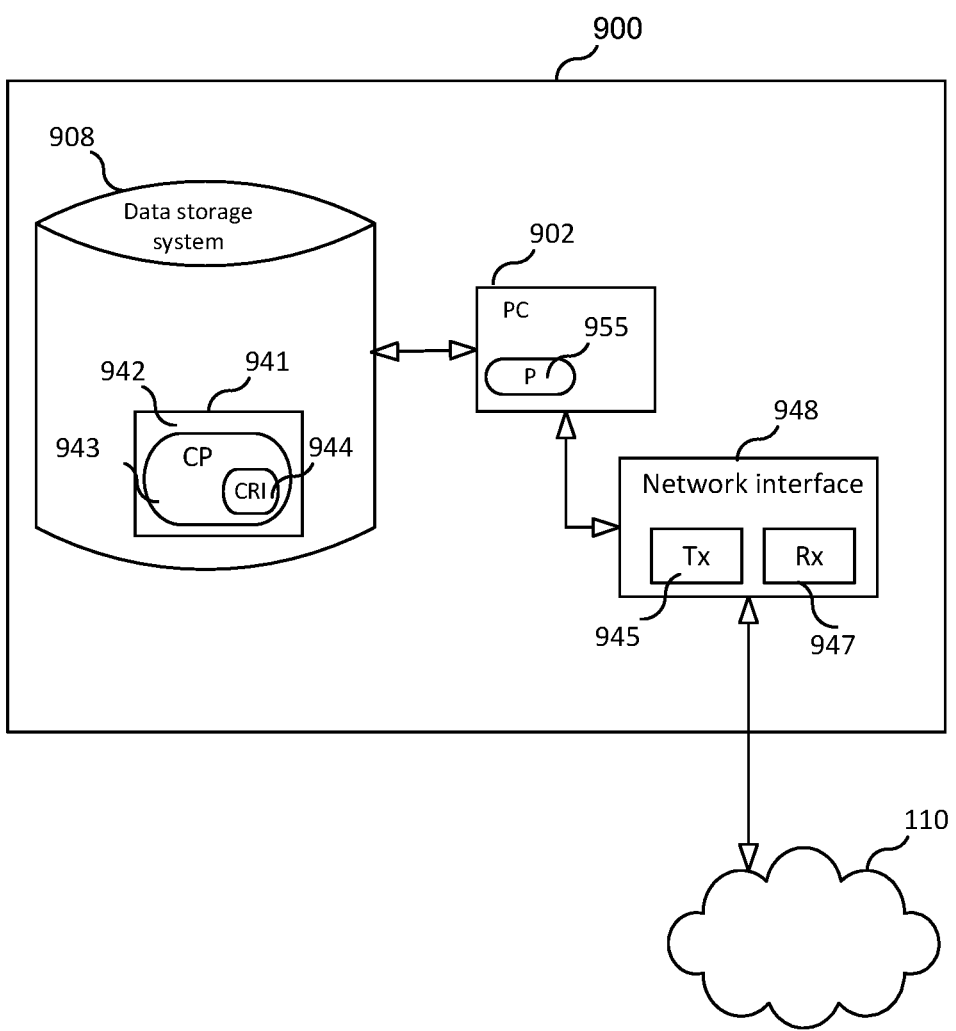
FIG. 9 is a block diagram of an apparatus according to an embodiment.

FIG. 9 is a block diagram of an apparatus 900, according to some embodiments, for implementing the video encoder 140 or the video decoder 260. As shown in FIG. 9, apparatus 900 may comprise: processing circuitry (PC) 902, which may include one or more processors (P) 955 (e.g., a general purpose microprocessor and/or one or more other processors, such as an application specific integrated circuit (ASIC), field-programmable gate arrays (FPGAs), and the like), which processors may be co-located in a single housing or in a single data center or may be geographically distributed (i.e., apparatus 900 may be a distributed computing apparatus); a network interface 948 comprising a transmitter (Tx) 945 and a receiver (Rx) 947 for enabling apparatus 900 to transmit data to and receive data from other nodes connected to a network 110 (e.g., an Internet Protocol (IP) network) to which network interface 948 is connected (directly or indirectly) (e.g., network interface 948 may be wirelessly connected to the network 110, in which case network interface 948 is connected to an antenna arrangement); and a local storage unit (a.k.a., "data storage system") 908, which may include one or more non-volatile storage devices and/or one or more volatile storage devices. In embodiments where PC 902 includes a programmable processor, a computer program product (CPP) 941 may be provided. CPP 941 includes a computer readable medium (CRM) 942 storing a computer program (CP) 943 comprising computer readable instructions (CRI) 944. CRM 942 may be a non-transitory computer readable medium, such as, magnetic media (e.g., a hard disk), optical media, memory devices (e.g., random access memory, flash memory), and the like. In some embodiments, the CRI 944 of computer program 943 is configured such that when executed by PC 902, the CRI causes apparatus 900 to perform steps described herein (e.g., steps described herein with reference to the flow charts). In other embodiments, apparatus 900 may be configured to perform steps described herein without the need for code. That is, for example, PC 902 may consist merely of one or more ASICs. Hence, the features of the embodiments described herein may be implemented in hardware and/or software.

Figure 10A:
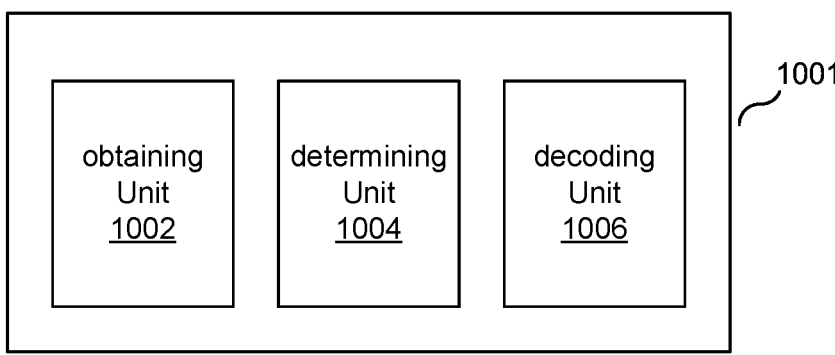
FIG. 10A is a block diagram of a video decoding apparatus according to an embodiment.

FIG. 10A illustrates functional units of a video decoding apparatus 1001 according to an embodiment.

Figure 10B:
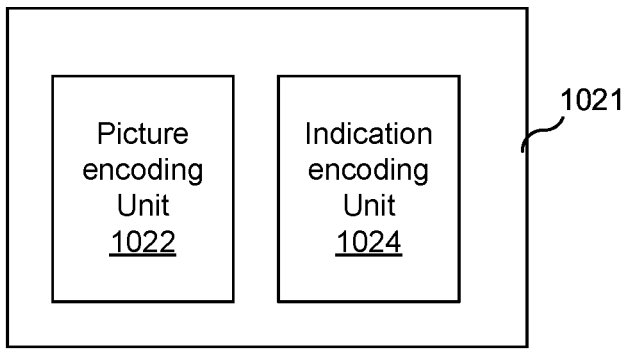
FIG. 10B is a block diagram of a video encoding apparatus according to an embodiment.

FIG. 10B illustrates functional units of a video encoding apparatus 1021 according to an embodiment.

Figure 10C:
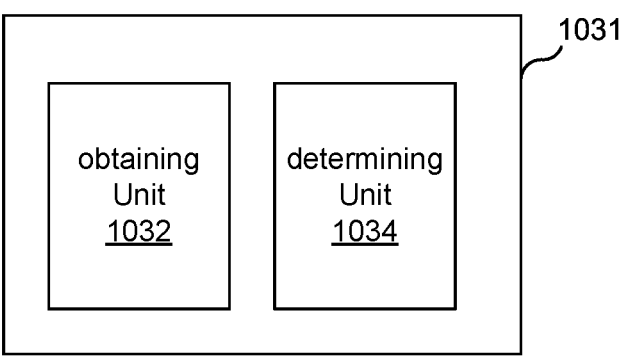
FIG. 10C is a block diagram of a video decoding apparatus according to an embodiment.

FIG. 10C illustrates functional units of a video decoding apparatus 1031 according to an embodiment.

Abbreviations

ALF Adaptive Loop Filter
APS Adaptation Parameter Set
AUD Access Unit Delimiter
BLA Broken Link Access
CRA Clean Random Access
CVS Coded Video Sequence
CVSS CVS Start
CU Coding Unit
DPS Decoder Parameter Set
GRA Gradual Random Access
HEVC High-efficiency Video Coding
IDR Instantaneous Decoding Refresh
IRAP Intra Random Access Point
JVET Joint Video Exploratory Team
LA Layer Access
LMCS Luma Mapping and Chroma Scaling
MPEG Motion Picture Experts Group
NAL Network Abstraction Layer
PES Packetized Elementary Stream
PPS Picture Parameter Set
RADL Random Access Decodable Leading
RASL Random Access Skip Leading
SPS Sequence Parameter Set STSA Step-wise Temporal Sub-layer Access
TSA Temporal Sub-layer Access
VCL Video Coding Layer
VPS Video Parameter Set
VVC Versatile Video Coding
SEI Supplemental Enhancement Layer While various embodiments are described herein (including the attached contribution), it should be understood that they have been presented by way of example only, and not limitation. Thus, the breadth and scope of this disclosure should not be limited by any of the above-described exemplary embodiments. Moreover, any combination of the above-described elements in all possible variations thereof is encompassed by the disclosure unless otherwise indicated herein or otherwise clearly contradicted by context.

Additionally, while the processes described above and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel.

The invention claimed is:

1. A method for decoding a set of pictures from a bitstream, the method comprising:

obtaining a step-wise temporal sub-layer access (STSA) indication identifying an STSA picture in an access unit, the access unit comprising an ordered sequence of network abstraction layer (NAL) units, wherein i) the STSA picture has a temporal layer identifier value that identifies a temporal layer and ii) the STSA picture is followed by other pictures in a decoding order;

determining, based on the STSA indication, an STSA position in the bitstream; and decoding the STSA picture and one or more other pictures following the STSA picture in the decoding order, wherein no parameter set that: a) has a particular type, b) has a temporal layer identifier value equal to the temporal layer identifier value of the STSA picture, and c) precedes the STSA position is used for decoding the STSA picture or any other picture that: i) follows the STSA picture in the decoding order and ii) has a temporal layer identifier value that is equal to the temporal layer identifier value of the STSA picture, and the STSA position is determined to be the position of the first NAL unit in the ordered sequence of NAL units.

2. The method of claim 1, wherein the particular type is any type included in a set of one or more particular types, wherein the set of one or more particular types includes an adaptation parameter set (APS) type.

3. The method of claim 1, wherein the particular type is any type included in a set of one or more particular types, wherein the set of one or more particular types includes a picture parameter set (PPS) type.

4. The method of claim 1, wherein obtaining the STSA indication comprises deriving the STSA indication from a video coding layer (VCL) NAL unit type.

5. The method of claim 1, wherein the temporal layer identifier value of the STSA picture is not equal to the temporal layer value of the temporal layer to which the STSA picture belongs.

6. A method for encoding a picture, the method comprising:

encoding a step-wise temporal sub-layer access (STSA) picture, wherein the STSA picture has a temporal layer identifier value that identifies a temporal layer;

encoding an STSA indication that indicates the STSA picture, wherein an STSA position in the bitstream can be identified based on the STSA indication; and encoding other pictures that follow the STSA picture in a decoding order, wherein no parameter set that: a) has a particular type, b) has a temporal layer identifier value equal to the temporal layer identifier value of the STSA picture, and c) precedes the STSA position is used for encoding the STSA picture or any one of the other pictures following the STSA picture in the decoding order that has a temporal layer identifier value that is equal to the temporal layer identifier value of the STSA picture, the access unit comprises an ordered sequence of network abstraction layer (NAL) units, and the STSA position is the position of the first NAL unit in the ordered sequence of NAL units.

7. The method of claim 6, further comprising the encoder outputting the STSA picture, the STSA indication that identifies the STSA picture, and the other pictures that follow the STSA picture in the decoding order.

8. The method of claim 6, wherein the particular type is any type included in a set of one or more particular types, wherein the set of one or more particular types includes an adaptation parameter set (APS) type.

9. The method of claim 6, wherein the particular type is any type included in a set of one or more particular types, wherein the set of one or more particular types includes a picture parameter set (PPS) type.

10. The method of claim 6, wherein the temporal layer identifier value of the STSA picture is not equal to the temporal layer value of the temporal layer to which the STSA picture belongs.

11. A video decoder, the video decoder comprising:

memory; and processing circuitry coupled to the memory, wherein the video decoder is configured to perform a method that comprises:

obtaining a step-wise temporal sub-layer access (STSA) indication identifying an STSA picture in an access unit, the access unit comprising an ordered sequence of network abstraction layer (NAL) units, wherein i) the STSA picture has a temporal layer identifier value that identifies a temporal layer and ii) the STSA picture is followed by other pictures in a decoding order;

determining, based on the STSA indication, an STSA position in the bitstream; and decoding the STSA picture and one or more other pictures following the STSA picture in the decoding order, wherein no parameter set that: a) has a particular type, b) has a temporal layer identifier value equal to the temporal layer identifier value of the STSA picture, and c) precedes the STSA position is used for decoding the STSA picture or any other picture that: i) follows the STSA picture in the decoding order and ii) has a temporal layer identifier value that is equal to the temporal layer identifier value of the STSA picture, and the STSA position is determined to be the position of the first NAL unit in the ordered sequence of NAL units.

12. A video encoder, the video encoder comprising:

memory; and processing circuitry coupled to the memory, wherein the video encoder is configured to perform a method that comprises:

encoding a step-wise temporal sub-layer access (STSA) picture, wherein the STSA picture has a temporal layer identifier value that identifies a temporal layer;

encoding an STSA indication that indicates the STSA picture, wherein an STSA position in the bitstream can be identified based on the STSA indication; and encoding other pictures that follow the STSA picture in a decoding order, wherein no parameter set that: a) has a particular type, b) has a temporal layer identifier value equal to the temporal layer identifier value of the STSA picture, and c) precedes the STSA position is used for encoding the STSA picture or any one of the other pictures following the STSA picture in the decoding order that has a temporal layer identifier value that is equal to the temporal layer identifier value of the STSA picture, the access unit comprises an ordered sequence of network abstraction layer (NAL) units, and the STSA position is the position of the first NAL unit in the ordered sequence of NAL units.

13. A non-transitory computer readable medium storing a computer program comprising instructions which when executed by processing circuitry of a decoder causes the decoder to perform the method of claim 1.

14. A non-transitory computer readable medium storing a computer program comprising instructions which when executed by processing circuitry of an encoder causes the encoder to perform the method of claim 6.

* * * * *